(12) United States Patent
Norota et al.

(10) Patent No.: US 9,817,623 B2
(45) Date of Patent: Nov. 14, 2017

(54) SYSTEM AND METHOD FOR PROVIDING SETTING INFORMATION TO A TARGET DEVICE

(71) Applicants: Ken Norota, Kanagawa (JP); Tomoyuki Takahira, Kanagawa (JP); Teruaki Takahashi, Kanagawa (JP); Yuuta Hashimoto, Tokyo (JP); Naoki Fukasawa, Kanagawa (JP); Susumu Fujioka, Kanagawa (JP)

(72) Inventors: Ken Norota, Kanagawa (JP); Tomoyuki Takahira, Kanagawa (JP); Teruaki Takahashi, Kanagawa (JP); Yuuta Hashimoto, Tokyo (JP); Naoki Fukasawa, Kanagawa (JP); Susumu Fujioka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/603,975

(22) Filed: Jan. 23, 2015

(65) Prior Publication Data
US 2015/0212769 A1   Jul. 30, 2015

(30) Foreign Application Priority Data

Jan. 27, 2014  (JP) ................................. 2014-012843
Dec. 25, 2014  (JP) ................................. 2014-263370

(51) Int. Cl.
*G06F 3/12*  (2006.01)
*H04N 1/00*  (2006.01)

(52) U.S. Cl.
CPC .......... *G06F 3/1292* (2013.01); *G06F 3/1205* (2013.01); *G06F 3/1236* (2013.01);
(Continued)

(58) Field of Classification Search
CPC ......................... H04N 1/00472; G03G 15/502
See application file for complete search history.

(56) References Cited

U.S. PATENT DOCUMENTS

2007/0236728 A1* 10/2007 Kobayashi ............ G06F 3/1204
                                                           358/1.15
2007/0283253 A1    12/2007 Asakimori et al.
(Continued)

FOREIGN PATENT DOCUMENTS

JP   2012-058834    3/2012
JP   2013-214806   10/2013

*Primary Examiner* — Nicholas Pachol
(74) *Attorney, Agent, or Firm* — Oblon, McClelland, Maier & Neustadt, L.L.P.

(57) ABSTRACT

A terminal device displays a first screen related to a setting for processing executable by plural models of a device; acquires, from a target device, identification information for the model of the target device through a first communication unit and communication information for communicating with the target device through second communication unit; acquires, from a storing unit, processing information corresponding to the acquired identification information; transmits, to the target device, through the second communication unit, a setting entered through the first screen using communication information. If the processing information acquired through the second communication unit includes information on specific processing executable only by the model corresponding to the identification information, the terminal device further displays a second screen related to a setting for the specific processing, and further transmits the setting entered through the second screen, to the target device through the second communication unit, using the communication information.

20 Claims, 27 Drawing Sheets

(52) U.S. Cl.
CPC .......... *G06F 3/1253* (2013.01); *G06F 3/1257* (2013.01); *G06F 3/1291* (2013.01); *H04N 1/00127* (2013.01); *H04N 1/00472* (2013.01)

(56) References Cited

U.S. PATENT DOCUMENTS

| | | | | |
|---|---|---|---|---|
| 2008/0259390 A1* | 10/2008 | Murase | G06F 3/1204 | 358/1.15 |
| 2009/0031252 A1* | 1/2009 | Toda | G06F 9/4443 | 715/826 |
| 2011/0063639 A1* | 3/2011 | Yagiura | G06F 3/1205 | 358/1.9 |
| 2012/0057199 A1 | 3/2012 | Ikeura | | |
| 2012/0194844 A1* | 8/2012 | Natori | G06F 3/1205 | 358/1.13 |
| 2013/0215467 A1* | 8/2013 | Fein | G06F 3/1204 | 358/1.15 |
| 2013/0229673 A1* | 9/2013 | Nakayama | H04N 1/00127 | 358/1.13 |
| 2013/0229690 A1* | 9/2013 | Sumita | H04N 1/00127 | 358/1.15 |
| 2013/0231051 A1* | 9/2013 | Naruse | G06F 3/1204 | 455/41.2 |
| 2013/0258381 A1* | 10/2013 | Sato | G06F 3/1297 | 358/1.13 |
| 2013/0258392 A1* | 10/2013 | Dohi | H04N 1/00408 | 358/1.14 |
| 2013/0258402 A1* | 10/2013 | Arai | H04N 1/00344 | 358/1.15 |
| 2014/0036299 A1 | 2/2014 | Norota | | |
| 2014/0055813 A1* | 2/2014 | Kim | G06F 3/1293 | 358/1.15 |
| 2014/0179317 A1* | 6/2014 | Tanaka | H04W 60/00 | 455/435.2 |
| 2014/0211254 A1* | 7/2014 | Takeuchi | G06F 3/126 | 358/1.15 |
| 2014/0240772 A1* | 8/2014 | Suzuki | H04N 1/00228 | 358/1.15 |
| 2014/0253965 A1* | 9/2014 | Asai | G06F 3/1205 | 358/1.15 |
| 2014/0355047 A1* | 12/2014 | Lee | G06F 3/1292 | 358/1.15 |
| 2014/0368857 A1* | 12/2014 | Edamatsu | G06K 15/1806 | 358/1.13 |
| 2015/0301767 A1* | 10/2015 | Morita | G06F 3/1205 | 358/1.13 |

* cited by examiner

FIG.4

| ITEM | DESCRIPTION |
|---|---|
| SSID | IDENTIFICATION INFORMATION FOR IDENTIFYING NETWORK TO BE CONNECTED |
| ENCRYPTION SCHEME | ENCRYPTION SCHEME USED ON NETWORK TO BE CONNECTED |
| PASSWORD | PASSWORD USED ON NETWORK TO BE CONNECTED |
| IP ADDRESS | NETWORK ADDRESS OF MFP WITH FUNCTION TO BE USED |
| HTTP PORT NO. | PORT NO. THROUGH WHICH COMMUNICATION IS PERFORMED TO USE FUNCTION OF MFP |
| HTTPS PORT NO. | PORT NO. THROUGH WHICH ENCRYPTED COMMUNICATION IS PERFORMED TO USE FUNCTION OF MFP |
| MODEL ID | IDENTIFICATION INFORMATION FOR IDENTIFYING MODEL OF MFP |

FIG.5

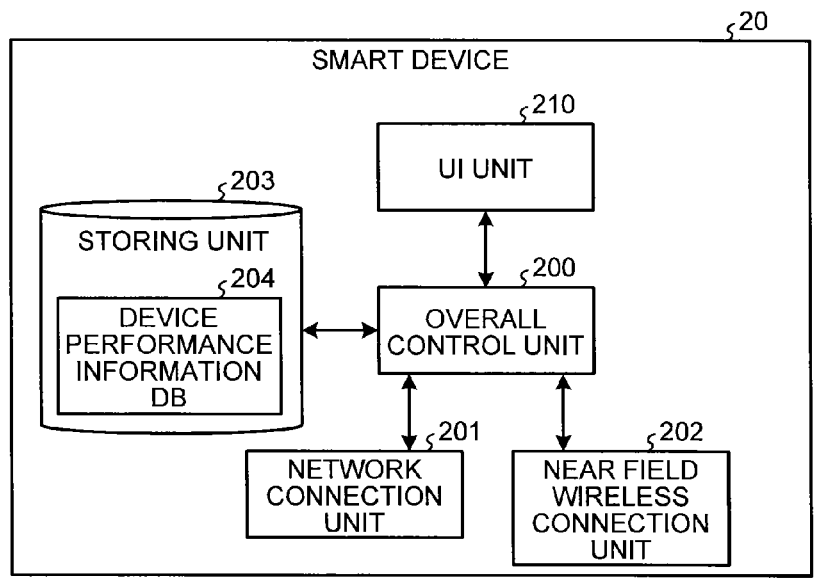

FIG.21

| ITEM | DESCRIPTION | |
|---|---|---|
| SSID | IDENTIFICATION INFORMATION FOR IDENTIFYING NETWORK TO BE CONNECTED | ⎫ |
| ENCRYPTION SCHEME | ENCRYPTION SCHEME USED ON NETWORK TO BE CONNECTED | ⎬ 105 |
| PASSWORD | PASSWORD USED ON NETWORK TO BE CONNECTED | |
| IP ADDRESS | NETWORK ADDRESS OF MFP WITH FUNCTION TO BE USED | |
| HTTP PORT NO. | PORT NO. THROUGH WHICH COMMUNICATION IS PERFORMED TO USE FUNCTION OF MFP | |
| HTTPS PORT NO. | PORT NO. THROUGH WHICH ENCRYPTED COMMUNICATION IS PERFORMED TO USE FUNCTION OF MFP | |
| MODEL ID | IDENTIFICATION INFORMATION FOR IDENTIFYING MODEL OF MFP | ⎭ |
| DEVICE PERFORMANCE INFORMATION | (SCAN) | ⎫ 104 |
| | ·RESOLUTION<br>·SCAN SIZE<br>·COLOR/MONOCHROME<br>... | ⎭ |

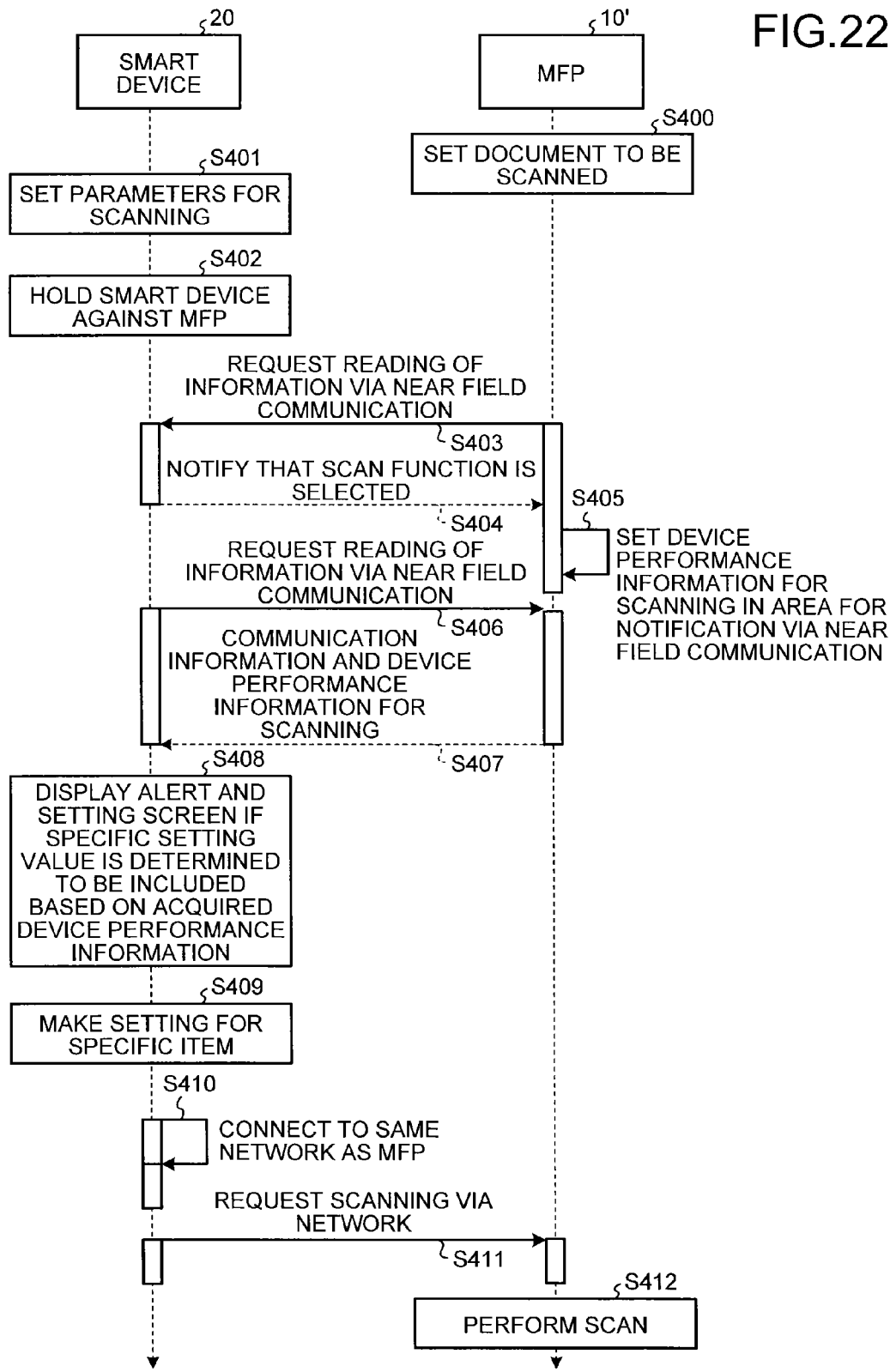

| MODEL ID | | |
|---|---|---|
| IMAGE PROJECTION FUNCTION | PERFORMANCE INFORMATION | |
| | NUMBER OF PROJECTION IMAGES | ONE-SCREEN/TWO SCREEN |
| | ⋮ | ⋮ |
| AUDIO OUTPUT FUNCTION | PERFORMANCE INFORMATION | |
| | ⋮ | ⋮ |

4104

SYSTEM AND METHOD FOR PROVIDING SETTING INFORMATION TO A TARGET DEVICE

CROSS-REFERENCE TO RELATED APPLICATIONS

The present application claims priority to and incorporates by reference the entire contents of Japanese Patent Application No. 2014-012843 filed in Japan on Jan. 27, 2014 and Japanese Patent Application No. 2014-263370 filed in Japan on Dec. 25, 2014.

BACKGROUND OF THE INVENTION

1. Field of the Invention

The present invention relates to a terminal device, an image processing system, and a computer program product.

2. Description of the Related Art

In these years, portable terminals are widely used as information processing devices, each of which includes a touch panel and a wireless communication unit, and is configured to be easily portable. Such portable terminals include, for example, multifunction telephone terminals (smartphones) having a telephone function and tablet computers mainly used for information processing. Hereinafter, such portable terminals are called smart devices. The smart devices use, as a way of wireless communication, near field communication using an integrated circuit (IC) tag or a wireless local area network (LAN) that enables communication at a higher speed and over a longer distance than the near field communication.

Meanwhile, as one type of image visualization devices having a function of visualizing image data, multifunction printers (MFPs) have heretofore been known that implement a plurality of functions, such as a printer function, a scanner function, a copy function, and a facsimile (fax) function, in one housing. In order to use the functions of an MFP from a smart device, techniques are known that connect the MFP to the smart device by combining the near field communication with the wireless LAN.

For example, the smart device first uses the near field communication to acquire, from the MFP, connection information for establishing a network connection thereto via the wireless LAN. The smart device then establishes a communication with the MFP via the wireless LAN based on the connection information acquired from the MFP, and communicates setting information and print information with the MFP via the network using the wireless LAN.

Japanese Patent Application Laid-open No. 2013-214806 discloses an MFP that includes a near field communication (NFC) tag and a wireless transmitter-receiver for communicating with a mobile phone; the MFP sends, to the mobile phone, information indicating a type of image processing accepted to be selected when the communication with the mobile phone has started to be established, and performs the image processing based on execution instruction information sent from the mobile phone according to the information indicating the type of image processing. According to Japanese Patent Application Laid-open No. 2013-214806, when a user uses a function of the MFP from the smart device (mobile phone), the user can save the trouble of setting again the function and setting values selected on the MFP side on the smart device, so that ease of operation for the user is improved.

In some cases, items settable as setting values for a function to be used vary among different models of MFPs. In those cases, the conventional smart devices perform various settings for an MFP after the network connection via the wireless LAN is established by exchanging the connection information of the network with the MFP using the near field communication, as described above. As a result, if the establishment of the network takes a long time, the user needs to wait until the function of the MFP can begin to be used, thus causing a problem in convenience.

Japanese Patent Application Laid-open No. 2013-214806 does not disclose a method for easily setting the items settable as setting values for a function to be used by MFPs from the mobile phone of the user when the items differ among the MFPs. Thus, Japanese Patent Application Laid-open No. 2013-214806 fails to resolve the problem in the convenience occurring when MFPs are used from a smart device (mobile phone).

Therefore, there is a need to improve the convenience in using an image visualization device from a smart device.

SUMMARY OF THE INVENTION

According to an embodiment, a terminal device connectable to a plurality of models of a device includes a display control unit, a first acquiring unit, a second acquiring unit, and a transmission unit. The display control unit displays, on a display, a first screen used for accepting a first setting for processing that is executable by the plurality of models of the device. The first acquiring unit acquire, from a target device to be controlled, through a first communication unit, identification information identifying which of the plurality of models is a model of the target device, and acquires, from the target device, through a second communication unit different from the first communication, communication information for communicating with the target device. The second acquiring unit acquires, from a storing unit that stores therein processing information of one or more models representing at least information on processing executable by the one or more models in a manner associated with the identification information identifying the one or more models. The processing information is associated with the identification information acquired by the first acquiring unit. The transmission unit transmits, to the target device, through the second communication unit, information representing the first setting accepted through the first screen displayed on the display, based on the communication information acquired by the first acquiring unit. When the processing information acquired by the second acquiring unit includes information on specific processing that is executable only by the model identified by the identification information associated with the processing information, the display control unit further displays, on the display, a second screen for accepting a second setting for the specific processing. The transmission unit further transmits, to the target device through the second communication unit, information representing the second setting accepted through the second screen, based on the communication information acquired by the first acquiring unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of communication information according to the first embodiment;

FIG. 5 is a functional block diagram of an example for explaining functions of a smart device according to the first embodiment;

FIG. 21 is a diagram illustrating an example of information stored in a storage area for near field communication according to the second embodiment;

FIG. 22 is a sequence diagram illustrating an example of communication processing according to the second embodiment;

DETAILED DESCRIPTION OF THE PREFERRED EMBODIMENTS

The following describes in detail embodiments of a terminal device, an image processing system, and a method and a computer program for controlling an image visualization device, with reference to the accompanying drawings.

First Embodiment

Figure 1:
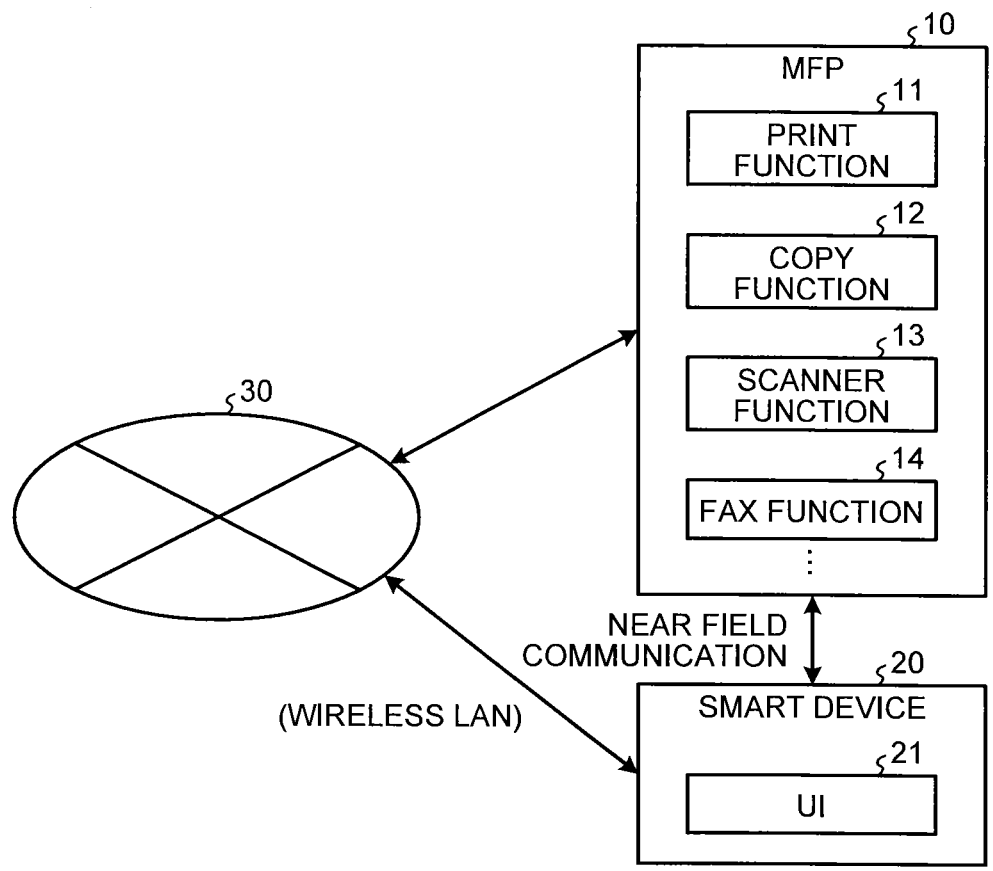
FIG. 1 is a diagram schematically illustrating an image processing system according to a first embodiment of the present invention.

FIG. 1 schematically illustrates an image processing system according to a first embodiment of the present invention. In FIG. 1, the image processing system according to the first embodiment includes a multifunction printer (MFP) 10 and a smart device 20.

The MFP 10 is an image forming device that implements a plurality of functions, such as a print function 11, a copy function 12, a scanner function 13, and a fax function 14, in one housing. The MFP 10 is an image visualization device that has a function of using the print function 11 to form externally supplied image data or image data obtained by scanning a document with the scanner function 13 as an image on a medium intended for forming an image thereon, such as a paper sheet, and thus to visualize the image data.

The smart device 20 is an information processing terminal device that includes a touch panel and a communication unit wirelessly communicating via a first communication path, and is configured to be easily portable. Examples of the smart device 20 include, but are not limited to, multifunction telephone terminals (smartphones) additionally having a telephone function and tablet computers mainly used for information processing. The smart device 20 includes a user interface (UI) 21 that presents information to a user using the touch panel and accepts operation inputs made by the user.

The MFP 10 is connected to a network 30 using, for example, a local area network (LAN) so as to be capable of wiredly or wirelessly communicating therewith. The smart device 20 is connected to the network 30 via a wireless communication, such as a wireless LAN. The description will be given below on the assumption that the network 30 adopts Transmission Control Protocol/Internet Protocol (TCP/IP) as a communication protocol.

The smart device 20 further includes, as a first communication unit, a near field communication unit that performs near field communication as wireless communication over a communication area with a very short range of, for example, approximately 10 cm. The near field communication unit is also provided in the MFP 10. The smart device 20 can perform the near field communication with the near field communication unit provided in the MFP 10. In other words, the smart device 20 includes the above-mentioned first communication path and a second communication path using the near field communication unit as communication paths for communicating with other devices.

In the first embodiment, an integrated circuit (IC) tag includes a storing unit and a near field wireless connection unit for performing the near field communication, and is pasted to be attached, as the near field communication unit, to the housing of the MFP 10. When the user holds the smart device 20 near the position of the IC tag of the MFP 10, the near field communication is performed between the smart device 20 and the IC tag, so that the smart device 20 can read information stored, for example, in the storing unit of the IC tag.

The smart device 20 always generates a magnetic field with a radius of, for example, approximately 10 cm, so that holding the smart device 20 near the position of the IC tag of the MFP 10 to enclose the IC tag in the magnetic field causes a coil provided in the IC tag to receive the magnetic field to produce a current. An integrated circuit embedded in the IC tag uses the current to communicate with the smart device 20. This communication conforms to, for example, the ISO/IEC14443 standard, and, in this case, uses a frequency band of 13.56 MHz to send the information stored in the storing unit provided in the IC tag to the smart device 20.

In the configuration as described above, the MFP 10 stores in advance, in the storing unit included therein and readable by the near field communication unit, a model identifier (ID) serving as identification information that can identify the model of the MFP 10 and communication information to be used by the smart device 20 for communicating with the MFP 10 via the network 30. The smart device 20 stores in advance, in a storing unit included therein, settable device performance information of the MFP 10, for one or more models of the MFP 10, in a manner associated with the model ID or IDs.

To use a function of the MFP 10 from the smart device 20, the user holds the smart device 20 in a region (such as near the position of the IC tag) supporting the near field communication of the MFP 10. The smart device 20 communicates with the near field communication unit of the MFP 10, and acquires the model ID and the communication information stored in the storing unit readable by the near field communication unit.

The smart device 20 uses the communication information acquired from the MFP 10 via the near field communication to communicate with the MFP 10 via the network 30 as a second communication unit. This communication via the network 30 allows the smart device 20 to send print data and execution instructions of the functions to the MFP 10. This capability allows the smart device 20 to use therefrom the functions of the MFP 10.

Furthermore, if the storing unit included in the smart device 20 stores therein the device performance information of a plurality of models of the MFP 10, the smart device 20 extracts device performance information common to the models of the MFP 10 based on the stored device performance information. The smart device 20 also reads, from the storing unit included in the smart device 20, the device performance information associated with the model ID acquired from the MFP 10 via the near field communication. If the device performance information read from the storing unit includes device performance information of a specific item (or items) that is (are) not included in the device performance information common to the models of the MFP 10, the smart device 20 displays the device performance information of the specific item (or items) on the UI 21 of the smart device 20.

The device performance information of the specific item (or items) can be displayed on the UI 21 when the communication is not established between the smart device 20 and the MFP 10 via the network 30. This capability allows the user to confirm a function specific (unique) to the target MFP 10 without waiting for the establishment of the communication between the smart device 20 and the MFP 10 via the network 30.

Configuration According to First Embodiment

Figure 2:
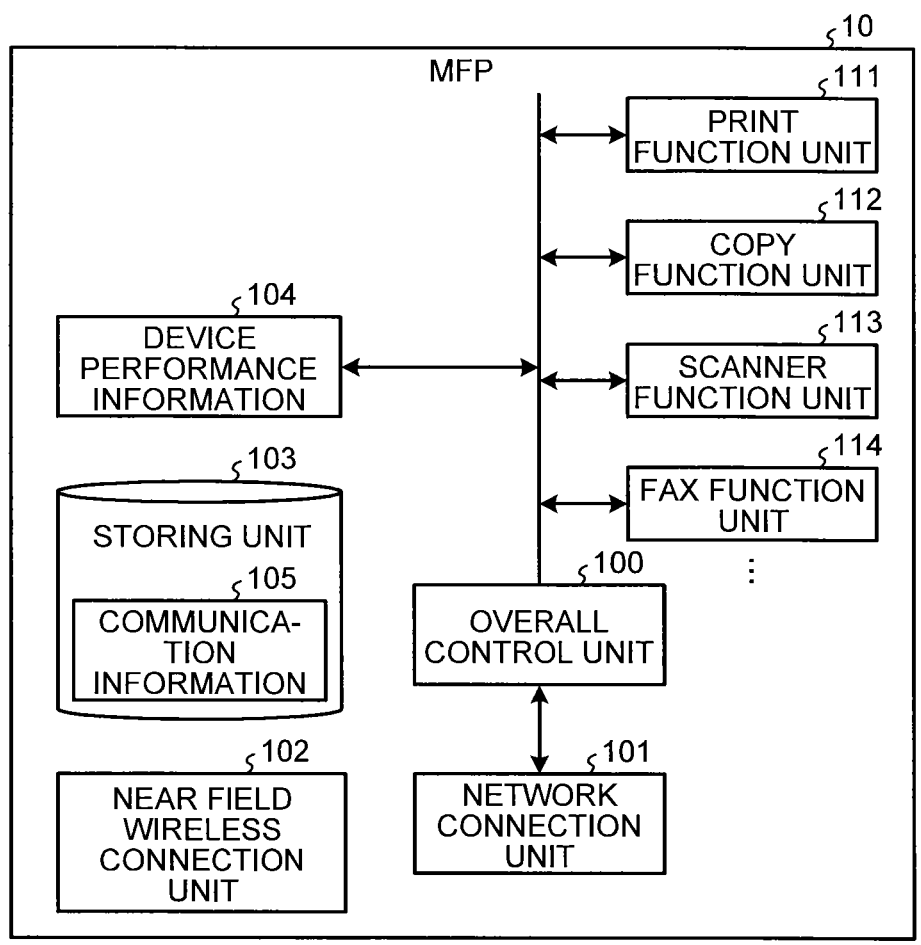
FIG. 2 is a functional block diagram of an example for explaining functions of a multifunction printer (MFP) according to the first embodiment.

FIG. 2 is a functional block diagram of an example for explaining the functions of the MFP 10 according to the first embodiment. In FIG. 2, the MFP 10 includes an overall control unit 100 and a network connection unit 101. The MFP 10 also includes a print function unit 111, a copy function unit 112, a scanner function unit 113, and a fax function unit 114, as examples of function units for implementing the functions of the MFP 10. Functions of the MFP 10 are not limited to the functions illustrated in FIG. 2.

The overall control unit 100 includes, for example, a central processing unit (CPU), a read-only memory (ROM), and a random access memory (RAM). The CPU follows a computer program stored in advance in the ROM and uses the RAM as a work memory to control the overall operation of the MFP 10. For example, the print function unit 111, the copy function unit 112, the scanner function unit 113, and the fax function unit 114 operate according to instructions of the overall control unit 100. The network connection unit 101 controls connection to the network 30 via wired or wireless communication. Device performance information 104 includes names of functions executable by the MFP 10 and parameters for implementing the functions, and is stored in advance, for example, in the ROM.

In the MFP 10 according to the first embodiment, a near field wireless connection unit 102 and a storing unit 103 are configured as devices external to the MFP 10. For example, the near field wireless connection unit 102 and the storing unit 103 are provided in the IC tag, which is pasted or attached to the housing of the MFP 10.

The storing unit 103 stores therein in advance communication information 105 to be used when the smart device 20 performs the communication with the MFP 10 via the network 30. The near field wireless connection unit 102 can read the communication information 105 from the storing unit 103 according to a request received via the near field communication, and can send the communication information 105 to a communication partner of the near field communication.

Figure 3:
FIG. 3 is a diagram illustrating an example of device performance information according to the first embodiment.

FIG. 3 illustrates an example of the device performance information 104 according to the first embodiment. FIG. 3 illustrates the device performance information 104 such that the settable performance information on the functions (the print function, the scanner function, etc.) of the MFP 10 is associated with the model ID serving as the identification information for identifying the model of the MFP 10. The settable performance information is information for each of the models of the MFP 10. Consequently, the settable performance information may vary depending on the model of the MFP 10.

In the example of FIG. 3, items, such as "Sheet Size", "Color/Monochrome", "Document Storage", and "Two-Color Printing", are defined as settable items for the print function in the device performance information 104. In the same manner, items, such as "Resolution", "Color/Monochrome", and "Scan Size", are defined as settable items for the scanner function.

FIG. 4 illustrates an example of the communication information 105 according to the first embodiment. In the example of FIG. 4, the communication information 105 includes items of "SSID", "Encryption Scheme", "Password", "IP Address", "HTTP Port No.", "HTTPS Port No.", and "Model ID".

Of the items included in the communication information 105, the item "SSID" (i.e., service set identifier) represents identification information (SSID) for identifying the network 30 to be connected. The item "Encryption Scheme" represents the encryption scheme used by the network 30 to be connected. The item "Password" represents the password used by the smart device 20 to be authenticated on the network 30 to be connected.

The smart device 20 can communicate with the network 30 by setting values represented by the items "SSID", "Encryption Scheme", and "Password" as communication settings.

The item "IP Address" (i.e., Internet Protocol address) represents the address (IP address) of the MFP 10 on the network 30. The Hypertext Transfer Protocol (HTTP) port number represents a communication port number of the MFP 10 for performing the communication to use a function of the MFP 10 via the network 30. The Hypertext Transfer Protocol Secure (HTTPS) port number represents a communication port number of the MFP 10 for performing the communication to use a function of the MFP 10 via the network 30 by encrypting transferred data packets.

In this manner, when the MFP 10 is used via the network 30 in the first embodiment, HTTP is used as a protocol to communicate with the MFP 10. The present invention is, however, not limited to this example. The port number for using the MFP 10 via the network 30 may be another port number, such as a line printer daemon protocol (LPR) port number or a standard Transmission Control Protocol/Internet Protocol (TCP/IP) port number.

When the IC tag including the near field wireless connection unit 102 and the storing unit 103 is used, values in the MFP 10 to which the IC tag is attached are stored as the items "IP Address", "HTTP Port No.", and "HTTPS Port No.". For example, setting the item "IP Address", and any one of the items "HTTP Port No." and "HTTPS Port No." on the smart device 20 allows the device to communicate with the MFP 10 via the network 30, and the communication enables the use of the function of the MFP 10.

The item "Model ID" represents the identification information for identifying the model of the MFP 10. As the model ID, the same value as the model ID associated with the device performance information 104 included in the MFP 10 is used.

FIG. 5 is a functional block diagram of an example for explaining functions of the smart device 20 according to the first embodiment. In FIG. 5, the smart device 20 includes an overall control unit 200, a network connection unit 201, a near field wireless connection unit 202, a storing unit 203, and a UI unit 210.

The overall control unit 200 includes, for example, a CPU, a ROM, and a RAM. The CPU follows a computer program stored in advance in the ROM and uses the RAM as a work memory to control the overall operation of the smart device 20.

The network connection unit 201 controls connection to the network 30 via wireless communication. The near field wireless connection unit 202 controls the communication using the near field wireless technique. For example, the near field wireless connection unit 202 connects to the near field wireless connection unit 102 included in the MFP 10 via the near field communication, and acquires the communication information 105 stored in the storing unit 103.

The storing unit 203 is configured by, for example, a nonvolatile semiconductor memory, and stores therein a device performance information database (DB) 204. The device performance information DB 204 stores therein respective pieces of the device performance information 104 of one or more models of the MFP 10 in a manner associated with the model ID or IDs.

According to instructions of the overall control unit 200, the UI unit 210 presents information to the user and accepts user operations, using, for example, a touch panel. In the first embodiment, the UI unit 210 serves as a display control unit that presents, to the user, a menu screen for selecting a function of the MFP 10 and a setting screen for making various settings for the selected function.

Figure 6:
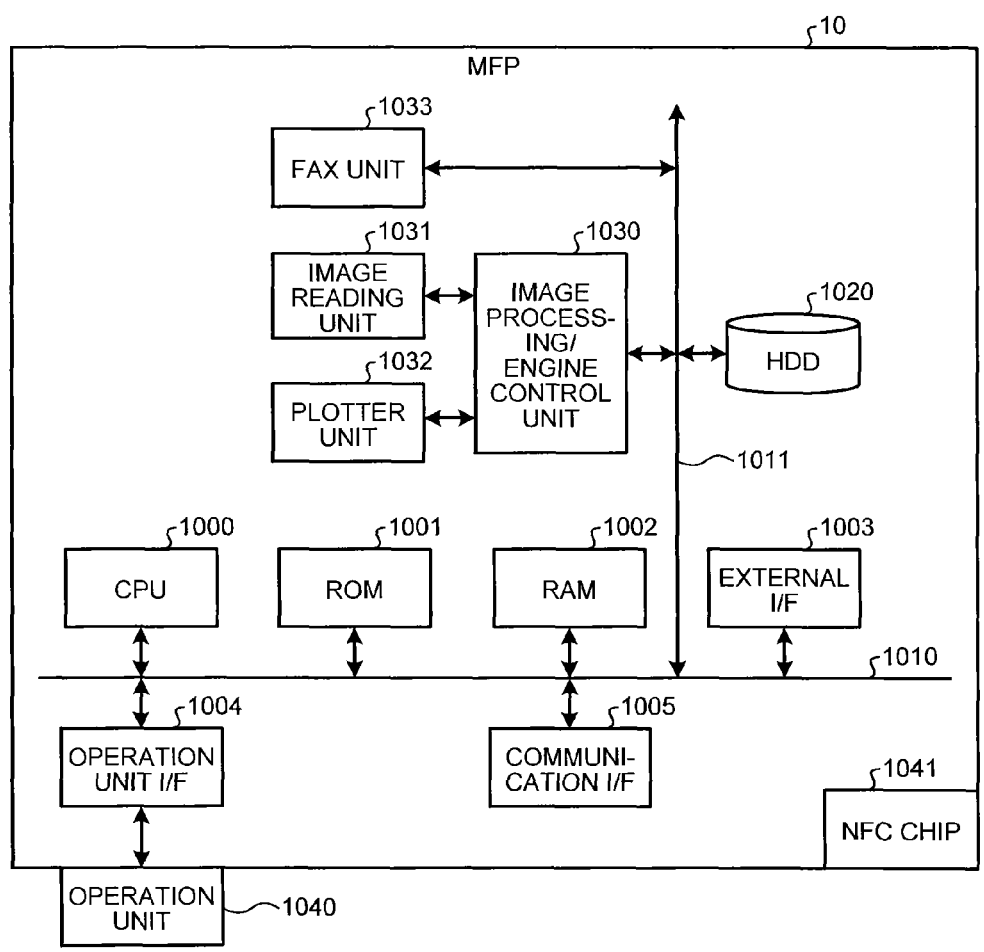
FIG. 6 is a block diagram illustrating an example of the hardware configuration of the MFP according to the first embodiment.

FIG. 6 illustrates an example of the hardware configuration of the MFP 10 according to the first embodiment. In FIG. 6, the MFP 10 includes a CPU 1000, a ROM 1001, a RAM 1002, an external interface (I/F) 1003, an operation unit I/F 1004, a communication I/F 1005, and a hard disk drive (HDD) 1020. The MFP 10 further includes a configuration to perform the functions of the MFP 10. In this example in which the MFP 10 has the print function, the copy function, the scanner function, and the fax function, the MFP 10 includes an image processing/engine control unit 1030, an image reading unit 1031, a plotter unit 1032, and a fax unit 1033, as the configuration to perform the functions. The above-mentioned units included in the MFP 10 are connected via buses 1010 and 1011 so as to be capable of communicating with each other.

The CPU 1000 follows, for example, a computer program stored in advance in the ROM 1001 and uses the RAM 1002 as a work memory to control the overall operation of the MFP 10. The HDD 1020 stores therein computer programs and data for operating the CPU 1000. The HDD 1020 stores therein in advance the device performance information 104 described above. The ROM 1001 may store therein the device performance information 104.

The operation unit I/F 1004 is connected to an operation unit 1040 that includes an operation element for accepting user operations and a display for presenting information to the user. A touch panel that outputs a signal corresponding to a touched position can be used as the operation element, and can be configured to be integral with the display. The operation unit I/F 1004 converts the signal output from the operation unit 1040 in response to the user operation into a control signal treatable by the CPU 1000, and outputs the result. The operation unit I/F 1004 also generates a signal for display from a display control signal fed from the CPU 1000, and allows the display of the operation unit 1040 to display a screen corresponding to the display control signal.

The communication I/F 1005 follows commands of the CPU 1000 to control the communication with the network 30. The external I/F 1003 is an interface, such as a universal serial bus (USB) interface, for connecting to external devices. Using the communication I/F 1005 and the external I/F 1003, the MFP 10 can, for example, receive data for using the functions, such as print data used by the print function and data for fax transmission used by the fax function, and send image data obtained by the scan function.

The image reading unit 1031 reads an image of a document data using photoelectric conversion elements, such as charge coupled devices (CCDs), and outputs the image data. The plotter unit 1032 forms an image on a medium based on the image data, using image forming method, such as an inkjet method or an electrophotographic method.

The image processing/engine control unit 1030 follows commands of the CPU 1000 to control operation of the image reading unit 1031 and the plotter unit 1032. The image processing/engine control unit 1030 also follows a command of the CPU 1000 to apply certain image processing to the image data read by the image reading unit 1031, and outputs the result to the bus 1011. The image processing/engine control unit 1030 further applies certain image processing to the image data supplied via the bus 1011, and feeds the result to the plotter unit 1032. The fax unit 1033 is connected, for example, to a public telephone line, and follows a command of the CPU 1000 to perform a fax transmission process of the image data supplied via the bus 1011.

A near field communication (NFC) chip 1041 is an IC tag having the function of the near field communication described above, and incorporates a communication unit for performing the near field communication and a memory, respectively corresponding to the near field wireless connection unit 102 and the storing unit 103. The NFC chip 1041 stores in advance the device performance information 104 and the communication information 105 in a memory embedded therein. The NFC chip 1041 is a device external to the MFP 10, and is, for example, pasted to the MFP 10. The position where the NFC chip 1041 is pasted to the MFP 10 is not limited, but the NFC chip 1041 is preferably pasted to a position where the near field communication can be easily performed with the smart device 20.

Figure 7:
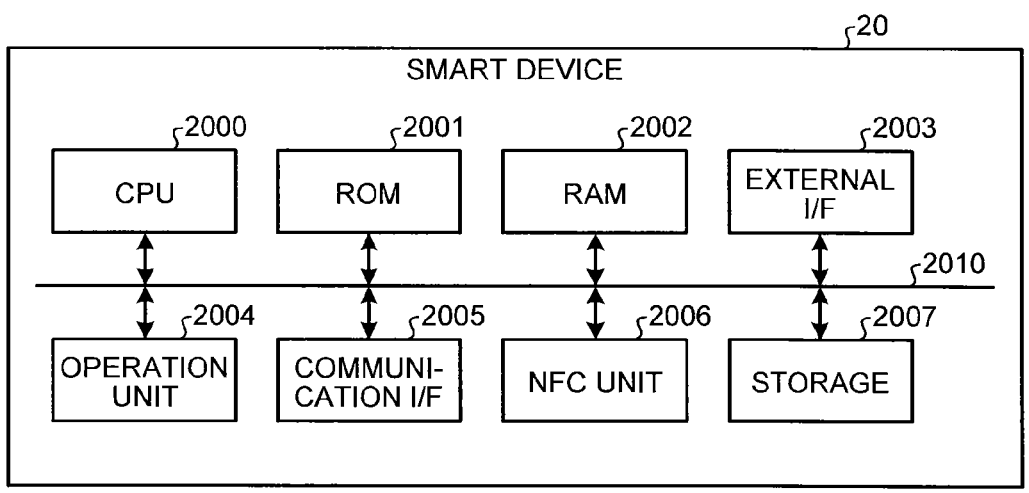
FIG. 7 is a block diagram illustrating an example of the hardware configuration of the smart device according to the first embodiment.

FIG. 7 illustrates an example of the hardware configuration of the smart device 20 according to the first embodiment. The smart device 20 includes a CPU 2000, a ROM 2001, a RAM 2002, an external I/F 2003, an operation unit 2004, a communication I/F 2005, an NFC unit 2006, and a storage 2007. These units are connected via a bus 2010 so as to be capable of communicating with each other.

The CPU 2000 follows, for example, a computer program stored in advance in the ROM 2001 and uses the RAM 2002 as a work memory to control the overall operation of the smart device 20. The functions of the overall control unit 200, the network connection unit 201, the near field wireless connection unit 202, and the UI unit 210, which have been described using FIG. 5, are implemented by the program operated by the CPU 2000.

The external I/F 2003 is an interface, such as a USB interface, for connecting to external devices.

The operation unit 2004 includes a display and an input unit for accepting user operations. According to control of the UI unit 210 based on commands of the CPU 2000, the operation unit 2004 displays information on the display, and outputs control signals corresponding to input operations made to the input unit. The operation unit 2004 can employ, for example, a liquid crystal display (LCD) as the display and a touch panel as the input unit. The display and the input unit are configured in an integrated manner.

According to control of the network connection unit 201 based on commands of the CPU 2000, the communication I/F 2005 performs the communication via the network 30. According to control of the near field wireless connection unit 202 based on commands of the CPU 2000, the NFC unit 2006 performs the near field communication.

The storage 2007 is configured by, for example, a non-volatile semiconductor memory, and can store therein various kinds of data. The storage 2007 may store therein a computer program for operating the CPU 2000.

The above-mentioned program according to the first embodiment for implementing the functions of the overall control unit 200, the network connection unit 201, the near field wireless connection unit 202, and the UI unit 210 is not limited to the example of being stored in the ROM 2001 in advance, but may be configured to be provided by being stored on a computer connected to a communication network, such as the Internet, and being downloaded via the communication network. The program may also be configured to be provided or distributed via a communication network, such as the Internet.

The program may also be provided by being recorded as a file in an installable format or an executable format on a computer-readable storage medium, such as a compact disc (CD) or a digital versatile disc (DVD).

The program according to the first embodiment has, for example, a module configuration including the above-described units (the overall control unit 200, the network connection unit 201, the near field wireless connection unit 202, and the UI unit 210). As actual hardware, the CPU 2000 reads the program from the ROM 2001 and executes the program to load the units in the main memory (such as the RAM 2002), so that the units are generated in the main memory.

Processing According to First Embodiment

Figure 8:
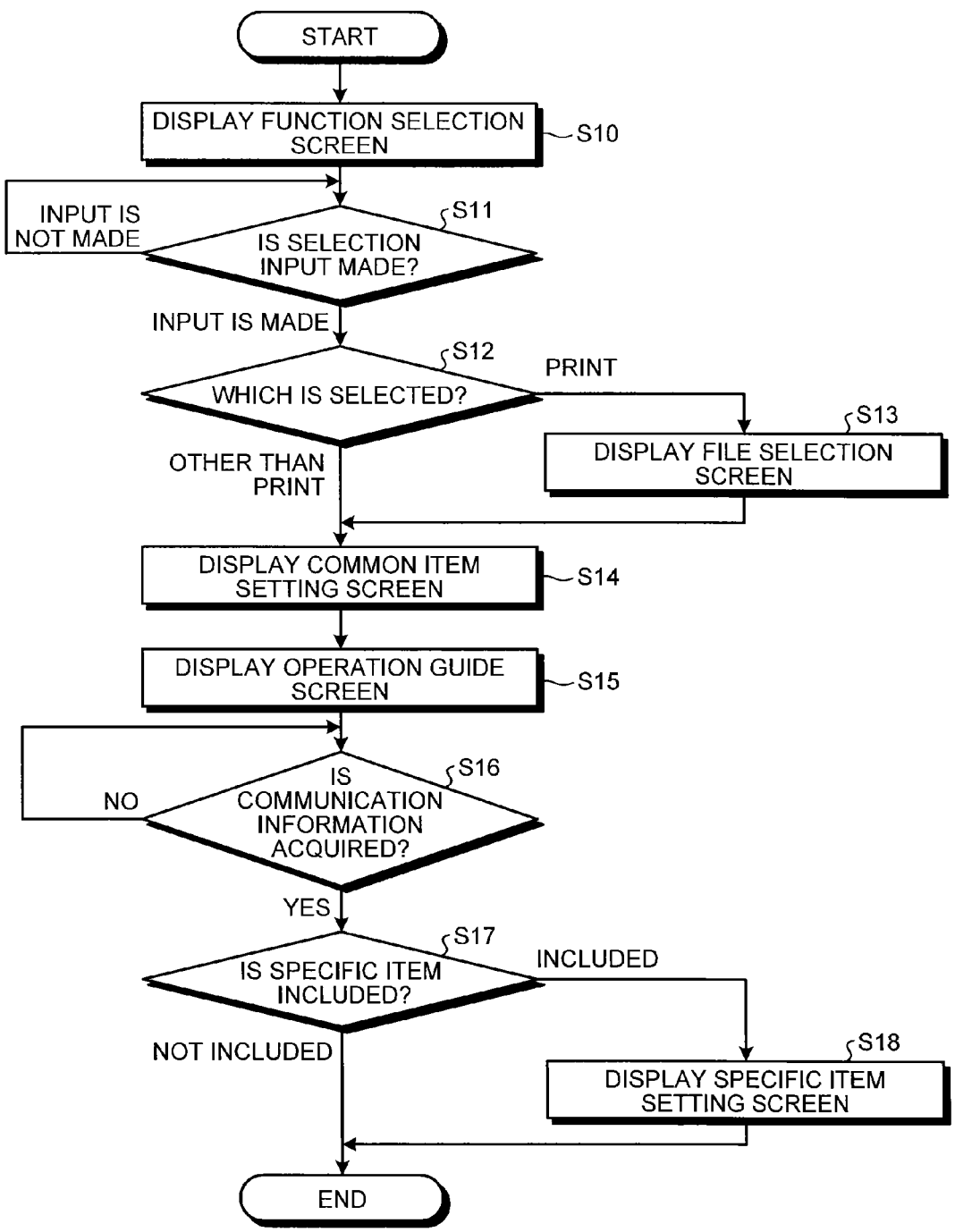
FIG. 8 is a diagram illustrating a flowchart of an example process in the smart device according to the first embodiment.

The processing according to the first embodiment will be more specifically described. FIG. 8 illustrates a flowchart of an example process in the smart device 20 according to the first embodiment. The example will be described for a case in which the user uses a function of a certain MFP 10 from the smart device 20 held by the user. The certain MFP 10 intended to be used by the user from the smart device 20 is hereinafter called the particular MFP 10.

The user first performs an operation of specifying the function to be used in the particular MFP 10 on the smart device 20. On the smart device 20, in response to the operation, the UI unit 210 displays a function selection screen 400 for selecting a function of the MFP 10, as illustrated in FIG. 9, on the display included in the operation unit 2004 (Step S10).

Figure 9:
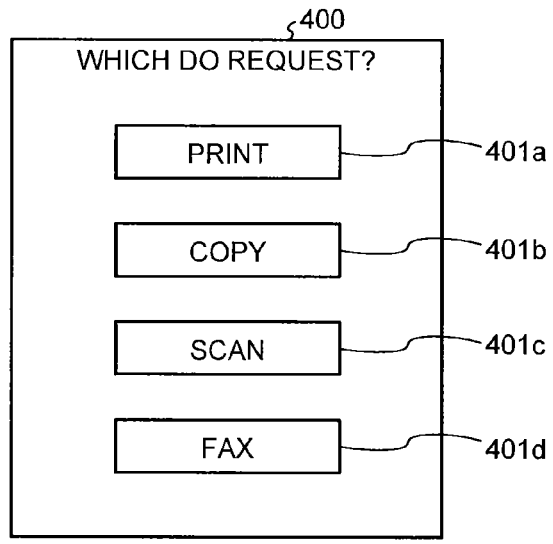
FIG. 9 is a diagram illustrating an example of a function selection screen according to the first embodiment for selecting a function of the MFP.

In FIG. 9, the function selection screen 400 displays buttons 401a, 401b, 401c, and 401d for selecting a function intended to be used from the print function 11, the copy function 12, the scanner function 13, and the fax function 14, respectively, of the MFP 10. The UI unit 210 waits for a selection input of a function by an operation to any of the buttons 401a, 401b, 401c, and 401d (Step S11).

After determining that any of the buttons 401a, 401b, 401c, and 401d is operated, the UI unit 210 performs processing at Step S12. At Step S12, the UI unit 210 determines which of the buttons 401a, 401b, 401c, and 401d is operated, that is, which of the print function 11, the copy function 12, the scanner function 13, and the fax function 14 of the MFP 10 is selected. If it is determined that any of buttons 401*b*, 401*c*, and 401*d* is operated and thus a function other than the print function 11 is selected, the UI unit 210 performs processing at Step S14.

If it is determined that the button 401*a* is operated and thus the print function 11 is selected, the UI unit 210 performs processing at Step S13. At Step S13, the UI unit 210 displays, on the display included in the operation unit 2004, a file selection screen for selecting a file to be printed by the print function 11.

The file selection screen may be a screen for selecting a file stored in the storage 2007 included in the smart device 20, or may be a screen for selecting a file stored in a file server on the network connected via the communication I/F 2005. The UI unit 210 reads the file selected by the user through the file selection operation performed on the file selection screen, and stores the file, for example, in the RAM 2002.

Figure 10:
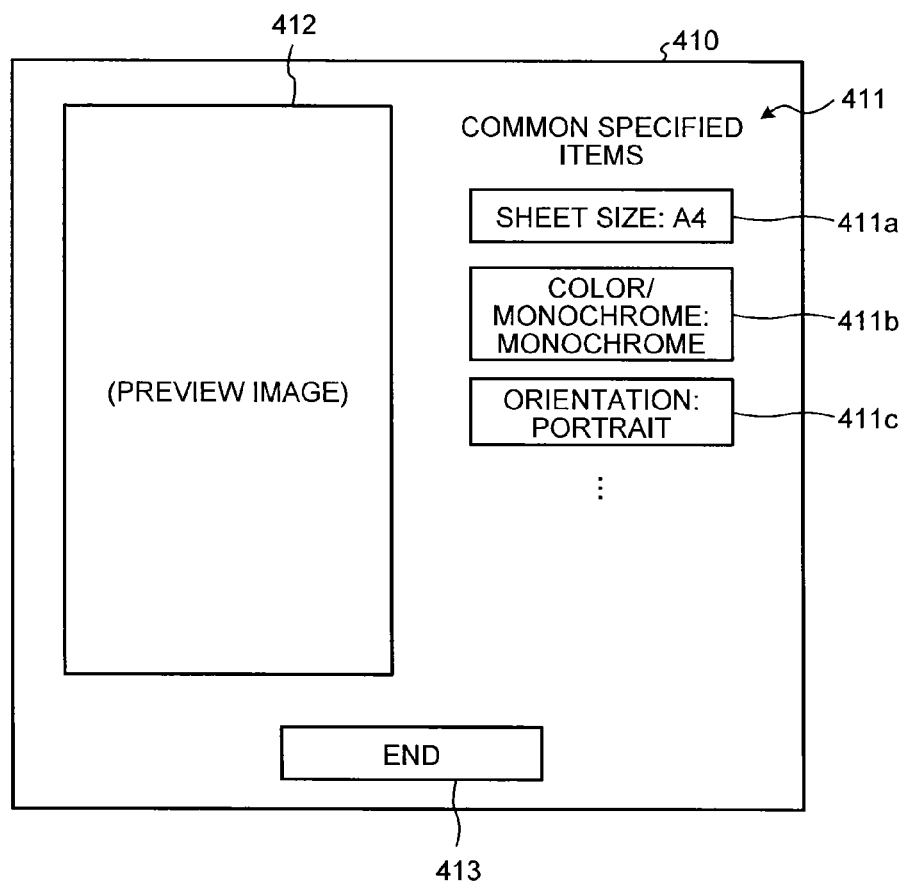
FIG. 10 is a diagram illustrating an example of a common item setting screen according to the first embodiment.

At the next step, Step S14, the UI unit 210 displays, on the display of the operation unit 2004, a common item setting screen as a first screen for making settings common to a plurality of models. FIG. 10 illustrates an example of the common item setting screen according to the first embodiment. For the purpose of explanation, the print function is assumed to be selected here. In FIG. 10, this common item setting screen 410 is provided, in an area 411 thereof, with buttons 411*a*, 411*b*, 411*c*, and so on for setting common specified items that can be specified in common among the models. Pressing an end button 413 notifies the UI unit 210 of an end of the various settings on the common item setting screen 410.

If the print function is selected as the function to be used in the particular MFP 10, a preview image area 412 for displaying a preview of an image to be printed is provided. For example, the UI unit 210 generates a preview image based on the file read by being selected on the file selection screen displayed at Step S13, and displays the preview image in the preview image area 412.

Figure 11:
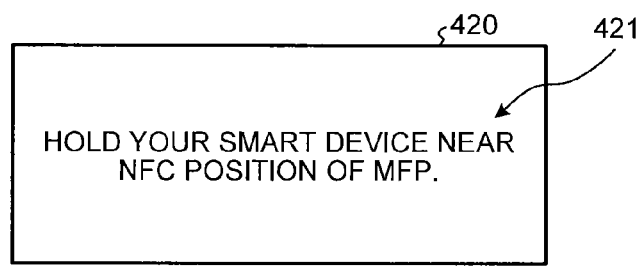
FIG. 11 is a diagram illustrating an example of an operation guide screen according to the first embodiment for prompting to start a near field communication.

After the setting of the various settings as a first setting on the common item setting screen 410 is finished and the end button 413 is operated, the process moves to Step S15. At Step S15, the UI unit 210 displays, on the display included in the operation unit 2004, an operation guide screen 420 for prompting to start the near field communication, as illustrated in FIG. 11. The operation guide screen 420 may be displayed so as to overlap the common item setting screen 410.

FIG. 11 illustrates a state in which a message 421 for prompting to start the near field communication is displayed on the operation guide screen 420. In this example, the message 421 prompts the user to hold the smart device 20 near the communication position of the particular MFP 10 for performing the near field communication. In the example of the first embodiment, the communication position of the particular MFP 10 corresponds to the position of the IC tag attached to the housing of the particular MFP 10, and the position of the IC tag corresponds to the position of the NFC chip 1041 described using FIG. 6.

The UI unit 210 of the smart device 20 determines whether the communication information 105 is acquired from the storing unit 103 in the IC tag via the near field communication performed with the IC tag of the MFP 10 (Step S16). The UI unit 210 repeats the processing at Step S16 until the communication information 105 is acquired from the IC tag (as a first acquiring unit). If it is determined that the communication information 105 is acquired, the UI unit 210 performs processing at Step S17.

At Step S17, the UI unit 210 determines whether the particular MFP 10 includes a specific item (or items). For example, based on the model ID included in the acquired communication information 105, the UI unit 210 searches the device performance information DB 204 stored in the storing unit 203 for the device performance information 104 corresponding to the model ID. If the device performance information DB 204 stores therein a plurality of pieces of the device performance information 104 for a plurality of model IDs, the UI unit 210 extracts the settable performance information common to the pieces of the device performance information.

The settable performance information can be considered to be processing information on executable processing in the model. The UI unit 210 serves as a second acquiring unit that acquires the processing information based on the model ID.

The UI unit 210 compares the settable performance information common to the extracted pieces of the device performance information with the settable performance information included in the device performance information 104 found based on the model ID acquired via the near field communication. As a result of this comparison, the UI unit 210 acquires, as the specific item (or items) of the particular MFP 10, the settable performance information that is present in the settable performance information included in the device performance information 104 found based on the model ID acquired via the near field communication, but is not present in the settable performance information common to the pieces of the device performance information.

If, at Step S17 described above, the particular MFP 10 is determined to include a specific item (or items), the UI unit 210 performs processing at Step S18. At Step S18, the UI unit 210 displays, on the display of the operation unit 2004, a specific item setting screen as a second screen for making a setting (or settings) for the item (or items) specific to the particular MFP 10.

An example of the specific item setting screen will be described using FIGS. 12 and 13. If it is determined that the particular MFP 10 includes a specific item, the UI unit 210 first displays, on the display included in the operation unit 2004, an alert display for prompting to select whether to make a setting for the specific item of the particular MFP 10.

Figure 12:
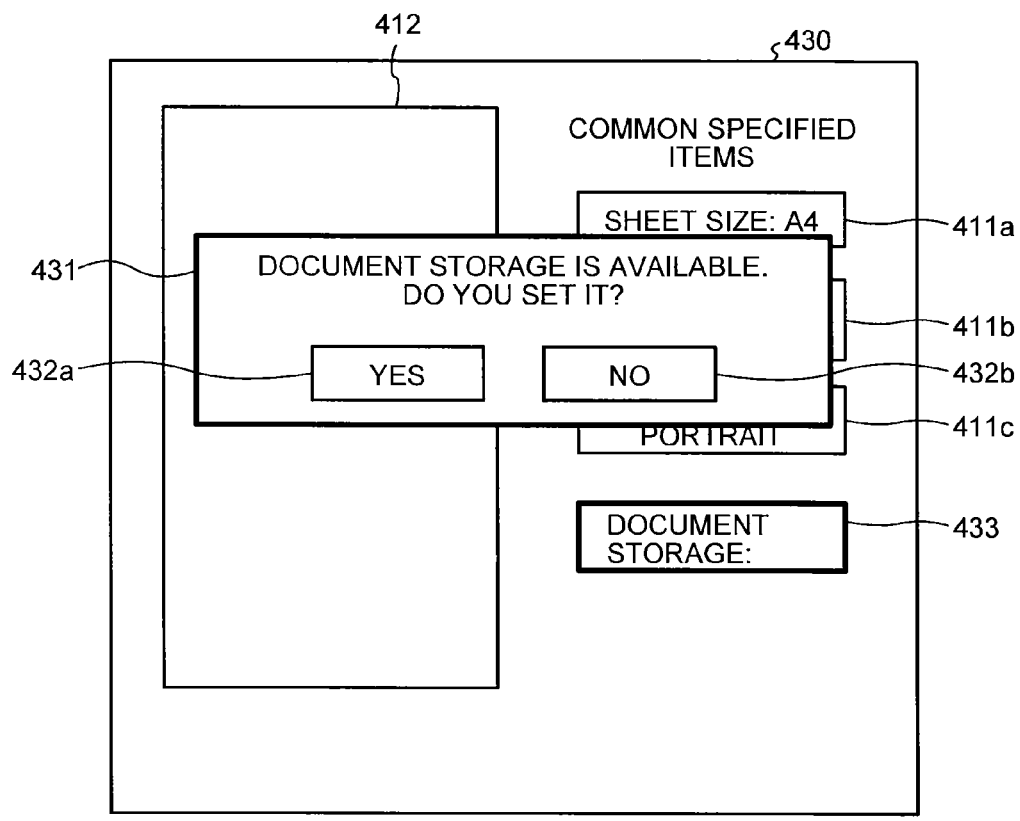
FIG. 12 is a diagram illustrating an example of an alert display according to the first embodiment.

FIG. 12 illustrates an example of this alert display 431. In this example, the alert display 431 is displayed so as to overlap a specific item setting screen 430. The alert display 431 is provided with a message identifying the specific item and prompting to select whether to make a setting for the specific item, and with buttons 432*a* and 432*b* for performing the selection. In this example, the button 432*a* selects to make the setting, and the button 432*b* selects not to make the setting. In the example of FIG. 12, the specific item setting screen 430 displays the buttons 411*a*, 411*b*, 411*c*, and so on for specifying the common specified items, and, in addition, a button 433 for setting the specific item. In the example of FIG. 12, the "Document Storage" is defined as a specific item, and the button 433 is a button that sets whether to perform the "Document Storage".

Figure 13:
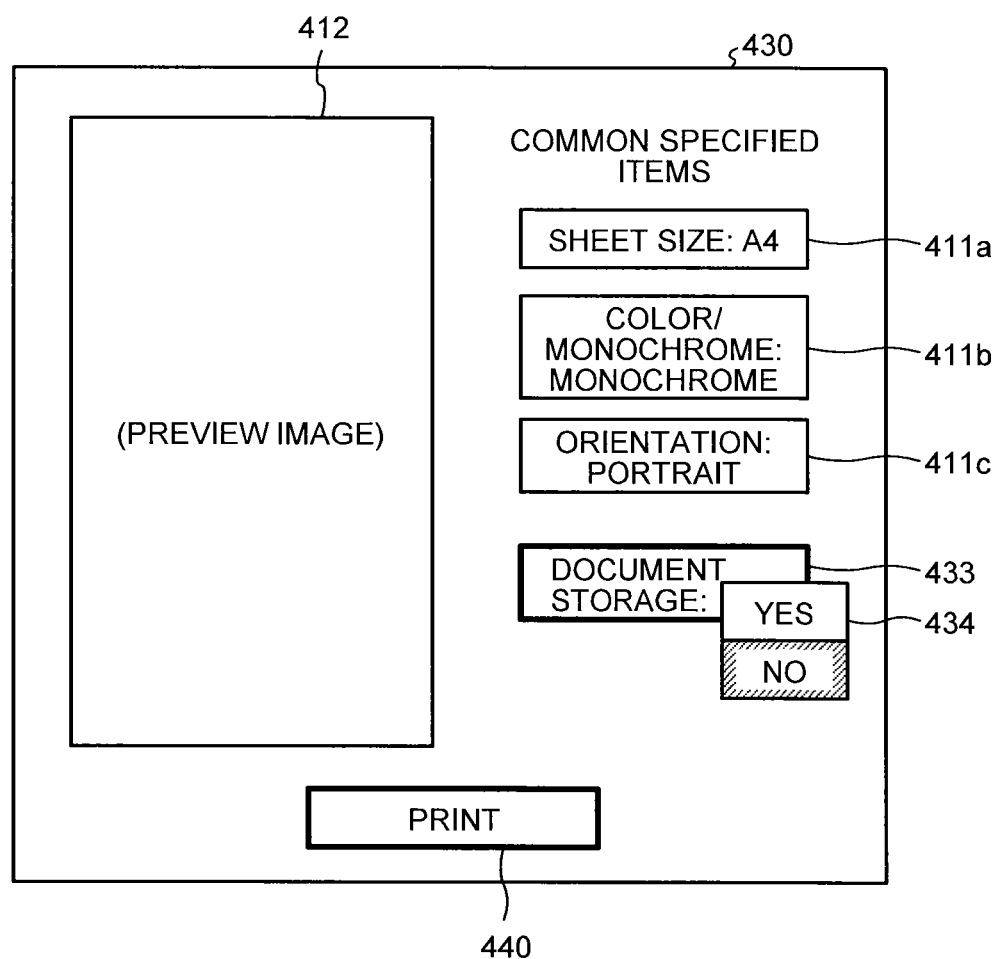
FIG. 13 is a diagram illustrating an example of a specific item setting screen according to the first embodiment.

FIG. 13 illustrates an example of the specific item setting screen 430 in the case in which, for example, the button 432*a* is operated on the alert display 431 to select to set the specific item. The example of FIG. 13 is an example of a case in which the button 432*a* of the alert display 431 is operated, and further, the button 433 for setting the specific item as a second setting is operated on the specific item setting screen 430 of FIG. 12. A selection portion 434 for selecting a setting value for the specific item and a print button 440 are displayed in FIG. 13.

An operation of the print button 440 by the user executes the print function in the MFP 10, and printing is performed based on the selected file. Specifically, on the smart device 20, the network connection unit 201 establishes the communication with the MFP 10 via the network 30 according to the communication information 105 acquired at Step S16; according to the operation of print button 440, the UI unit 210 sends the file for printing, a printing instruction, and the items of the setting information set on the common item setting screen 410 to the MFP 10 via the network 30; and according to the file and the information received via the network, the MFP 10 performs the printing.

If, at Step S17 described above, the particular MFP 10 is determined to include no specific item, the UI unit 210 displays, for example, a print button for issuing a print instruction on the display of the operation unit 2004. An operation of the print button by the user executes the print function in the MFP 10, and printing is performed based on the selected file, in the same manner as the example describe above.

In the example of FIG. 13, the UI unit 210 places the selection portion 434 in the state of selecting "No" by default. In this case, if, for example, the print button 440 is operated without an operation to the selection portion 434, the MFP 10 executes the print function without performing the operation of the "Document Storage" defined as a specific item. Naturally, if an operation of specifying "No" is performed to the selection portion 434 and then the print button 440 is operated, the MFP 10 executes the print function without performing the operation of the "Document Storage". If an operation of specifying "Yes" is performed to the selection portion 434 and then the print button 440 is operated, the MFP 10 executes the print function and the operation of the "Document Storage".

In the example of FIG. 13, the UI unit 210 places the selection portion 434 in the state of selecting "No" by default. The present invention is, however, not limited to this example. The UI unit 210 may place the selection portion 434, for example, in the state of selecting "Yes" by default. In this case, if the print button 440 is operated in the state in which no operation is performed to the selection portion 434, or if the operation of specifying "Yes" is performed to the selection portion 434 and then the print button 440 is operated, the MFP 10 executes the print function and the operation of the "Document Storage". If the operation of specifying "No" is performed to the selection portion 434, the MFP 10 does not perform the operation of the "Document Storage" when the print button 440 is operated.

Moreover, the UI unit 210 may place the selection portion 434 in the state of selecting neither "Yes" nor "No" by default. In this case, it is conceivable that, for example, the UI unit 210 may disable the print button 440 by default, and enable the print button 440 when an operation of specifying either "Yes" or "No" is performed to the selection portion 434.

In this manner, the first embodiment can determine whether the particular MFP 10 includes a specific item (or items) by locating the smart device 20 close to the communication position (position of the IC tag) in the particular MFP 10 and performing the communication for acquiring the model ID via the near field communication. If it is determined that the particular MFP 10 includes a specific item (or items), the first embodiment can perform the setting operation for the function of the specific item (or items). As a result, the first embodiment can confirm and make setting(s) for the item (or items) specific (unique) to the particular MFP 10 without waiting for the establishment of the connection between the smart device 20 and the particular MFP 10 via the network 30, thus improving convenience of the user.

A description will be given of processing when the smart device 20 is held near the position of the IC tag of the particular MFP 10 according to the operation guide screen 420, at Step S15 described above.

Figure 14:
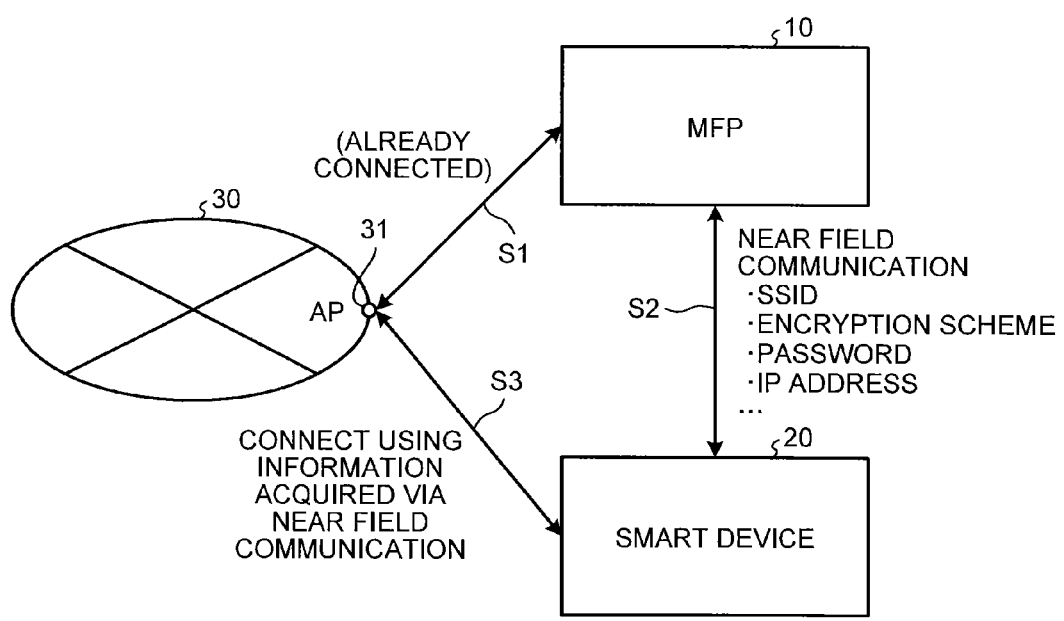
FIG. 14 is a diagram for explaining an outline of a connection process between the smart device and the MFP according to the first embodiment.

First, using FIG. 14, a description will be given of an outline of a connection process between the smart device 20 and the MFP 10 according to the first embodiment. In the first embodiment, the smart device 20 uses the particular MFP 10 via the network 30. In FIG. 14, the particular MFP 10 is already connected to the network 30 at an access point (AP) 31, and can perform communication (Step S1).

In this state, to use the particular MFP 10 from the smart device 20, the user follows the message 421 on the operation guide screen 420 illustrated in FIG. 11, and holds the smart device 20 near the position of the IC tag including the near field wireless connection unit 102 and the storing unit 103 described above in the MFP 10. This operation causes the near field communication to be performed between the smart device 20 and the IC tag.

Using the near field communication, the smart device 20 acquires the communication information 105 stored in the storing unit 103 included in the IC tag (Step S2). Using the information representing the SSID, the encryption scheme, and the password included in the communication information 105 acquired at Step S2, the smart device 20 connects to the access point 31 (Step S3). This operation allows the smart device 20 to communicate with the MFP 10 via the network 30.

Figure 15:
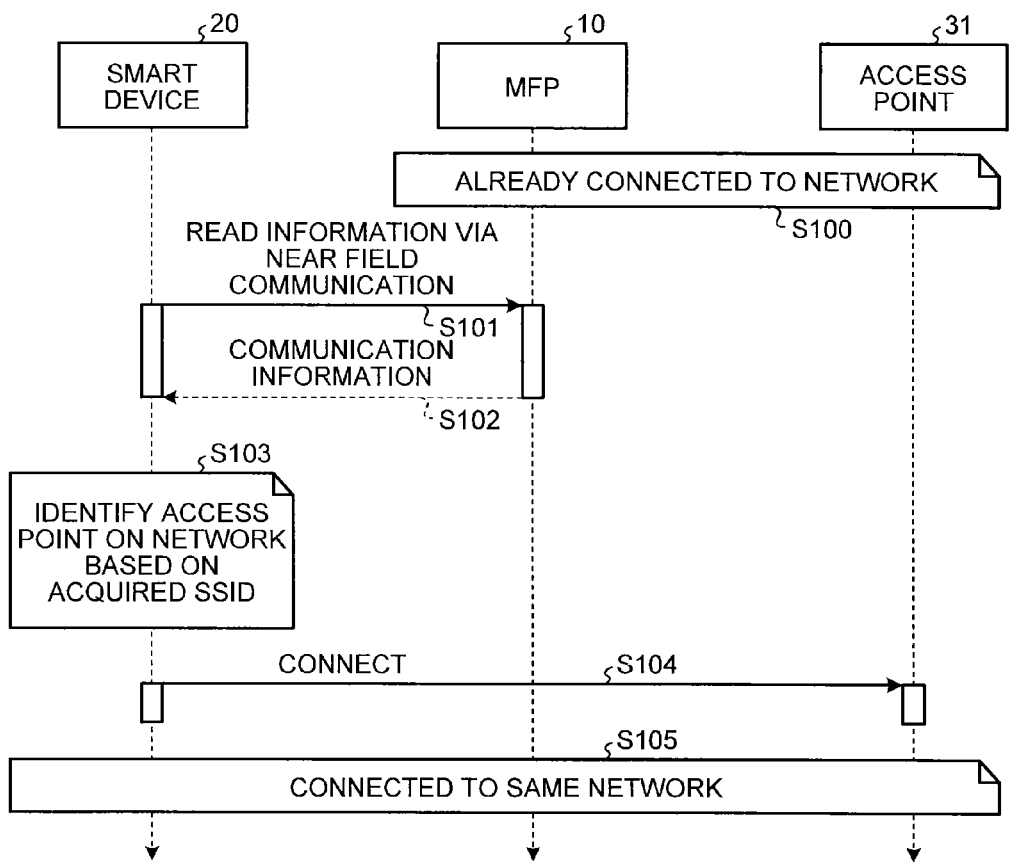
FIG. 15 is a sequence diagram of an example of connecting the smart device to the MFP via a network, according to the first embodiment.

FIG. 15 illustrates an example connection sequence to connect the smart device 20 to the MFP 10 via the network 30. In FIG. 15, as described above, the MFP 10 is already connected to the network 30 via the access point 31 (Step S100).

To connect the smart device 20 to the MFP 10 via the network 30, the user first holds the smart device 20 over the IC tag that is pasted to the MFP 10 and performs the near field communication (hereinafter, simply called the IC tag). This operation starts the near field communication between the near field wireless connection unit 202 of the smart device 20 and the IC tag.

Via this communication, the near field wireless connection unit 202 requests the communication information 105 from the near field wireless connection unit 102 included in the IC tag (Step S101). In response to this request, the near field wireless connection unit 102 reads the communication information 105 from the storing unit 103, and sends the communication information 105 thus read to the smart device 20 via the near field communication (Step S102). On the smart device 20, the communication information 105 is received by the near field wireless connection unit 202, and transferred to the network connection unit 201 via the overall control unit 200.

On the smart device 20, based on the SSID included in the communication information 105 received from the near field wireless connection unit 202, the network connection unit 201 identifies the access point 31 on the network 30 (Step S103). The network connection unit 201 then obtains the encryption scheme and the password from the communication information 105, and connects to the access point 31 (Step S104). The above-described process connects the smart device 20 to the network 30, which is the same network as that connected to the MFP 10 (Step S105).

The smart device 20 can execute the processing of Step S103 and later in FIG. 15 in parallel with the processing of Step S16 and later in FIG. 8. This parallel processing can establish the communication between the smart device 20 and the particular MFP 10 via the network 30 while, for example, the user is performing the above-described setting operations on the smart device 20.

Modification of First Embodiment

A first modification of the first embodiment will be described. The above description has assumed that the device performance information of the particular MFP 10 is already stored in the device performance information DB 204 in the storing unit 203 included in the smart device 20. The first modification of the first embodiment is an example of processing in which the device performance information of the particular MFP 10 is not stored in the device performance information DB 204 included in the smart device 20.

Figure 16:
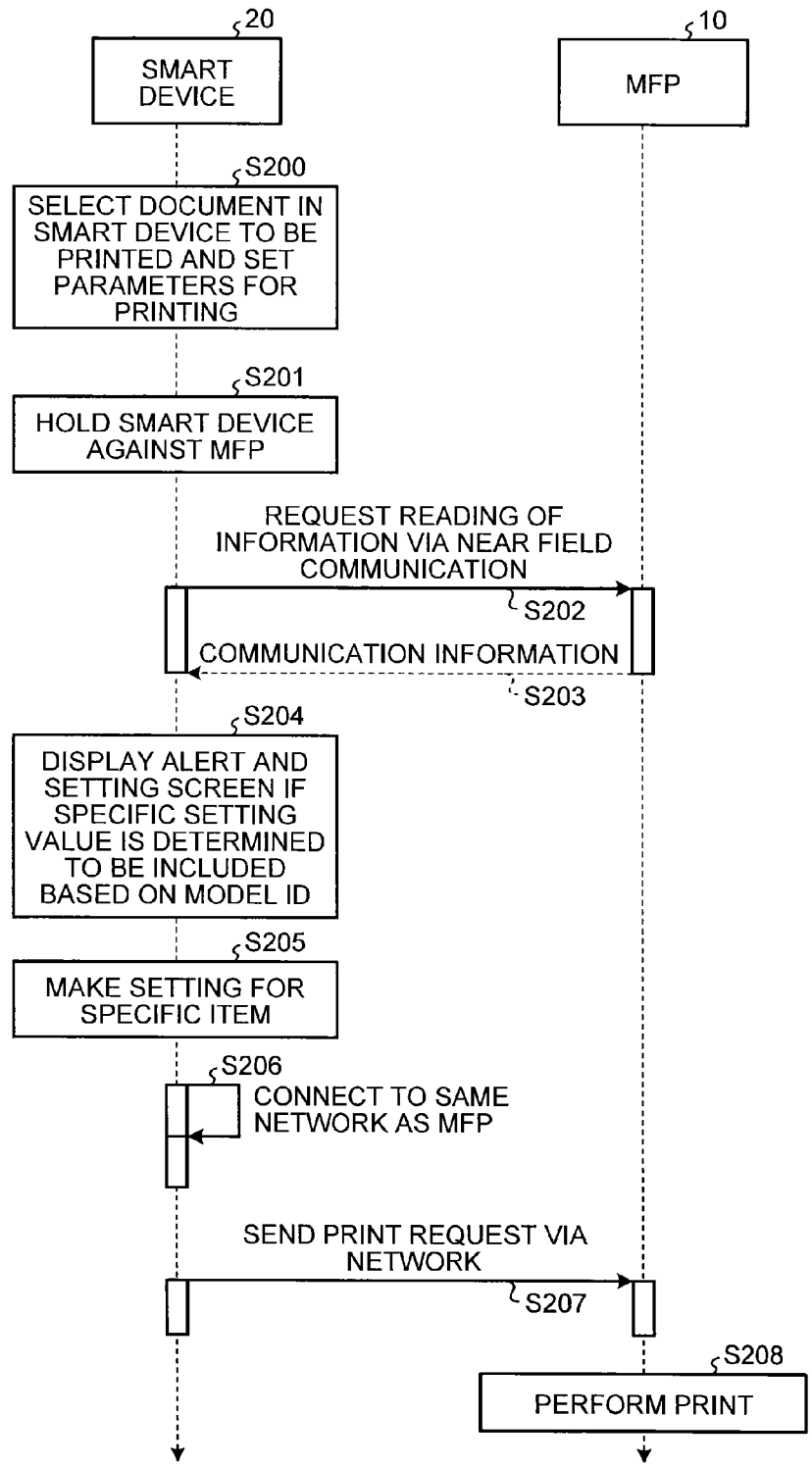
FIG. 16 is a sequence diagram for explaining processing according to the first embodiment.

Before describing the first modification of the first embodiment, for facilitating the understanding, a description will be given of processing when the device performance information of the particular MFP 10 is already stored in the device performance information DB 204 in the smart device 20, using FIG. 16. To avoid complications, the following describes operations in the units of the smart device 20 as operations of the smart device 20.

First, the smart device 20 displays the function selection screen 400 illustrated in FIG. 9 on the display. If, for example, the button 401a for selecting the print function is operated, the smart device 20 displays the file selection screen on the display to prompt to select a document to be printed. After a document is selected according to an operation on the file selection screen, the smart device 20 displays the common item setting screen 410 of FIG. 10 on the display, and, according to user operations on the common item setting screen 410, sets print parameters (Step S200).

After the print parameters are set on the common item setting screen 410, the smart device 20 displays the operation guide screen 420 illustrated in FIG. 11 on the display. When, in response to this display, the user holds the smart device 20 over the IC tag of the particular MFP 10 (Step S201), the near field communication starts between the smart device 20 and the IC tag of the MFP 10. Using the near field communication, the smart device 20 requests reading of the communication information 105 from the storing unit 103 in the IC tag (Step S202). In response to the request, the communication information 105 is read from the storing unit 103 of the IC tag pasted to the MFP 10, then sent from the IC tag, and acquired by the smart device 20 (Step S203).

The smart device 20 extracts the model ID from the communication information 105 acquired at Step S203, and searches the device performance information DB 204 for the device performance information 104 corresponding to the extracted model ID. If the device performance information 104 corresponding to the extracted model ID is found in the device performance information DB 204, the smart device 20 follows the process at Step S17 of FIG. 8 to determine whether the found device performance information 104 includes a specific item (or items). Based on the extracted model ID, if it is determined that the device performance information 104 includes a specific item (or items), the smart device 20 displays the alert display 431 and the specific item setting screen 430 illustrated in FIG. 12 on the display (Step S204). According to an operation (or operations) on the specific item setting screen 430, the specific item (or items) is (are) set (Step S205).

Based on the communication information 105 acquired at Step S203, the smart device 20 connects to the same network 30 as connected to the particular MFP 10, in the manner described using FIG. 15 (Step S206). The smart device 20 then sends a print request to the particular MFP 10 via the network 30 (Step S207). In response to the print request, the MFP 10 performs printing (Step S208).

Figure 17:
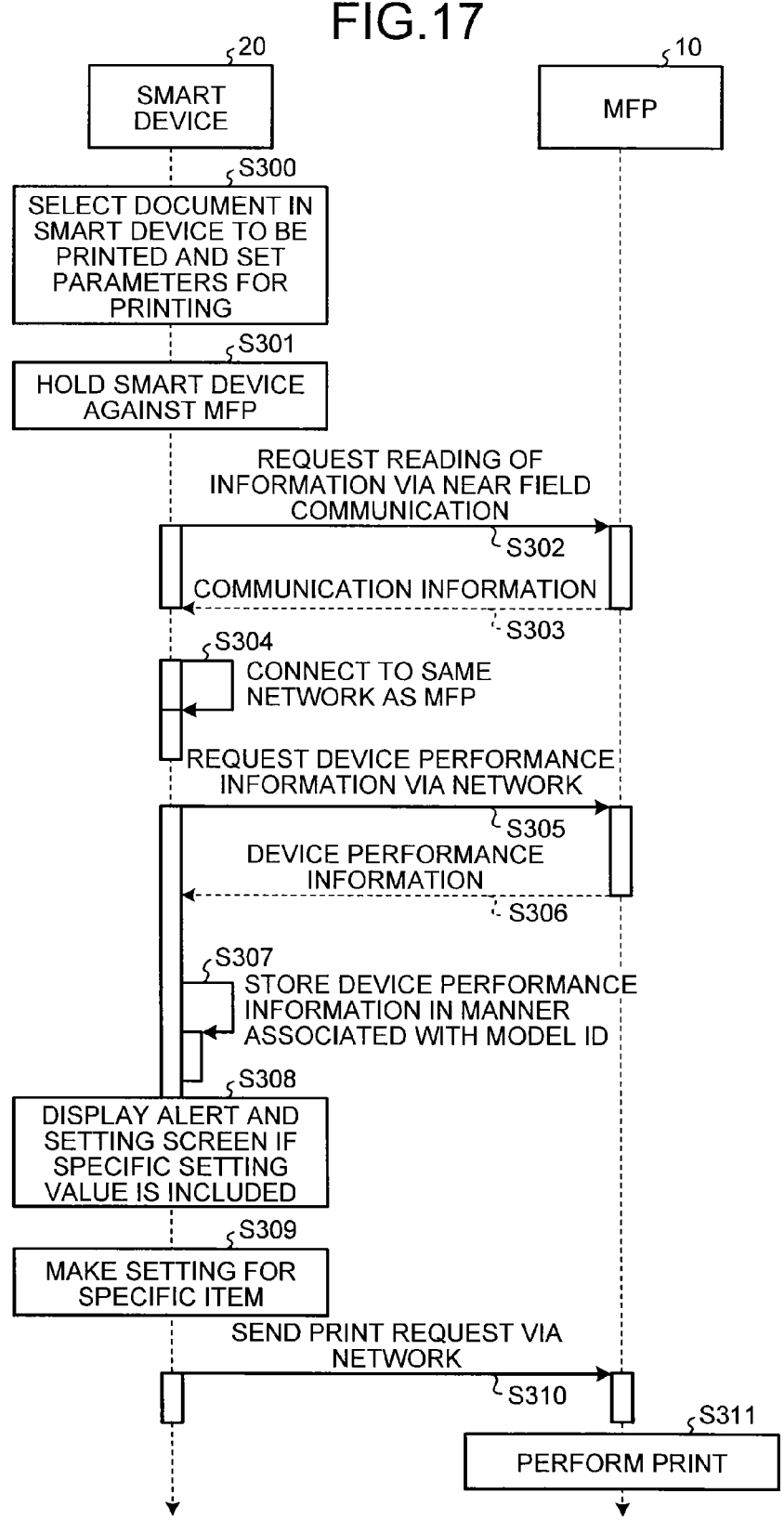
FIG. 17 is a sequence diagram for explaining processing according to a first modification of the first embodiment.

FIG. 17 illustrates the example of the processing according to the first modification of the first embodiment in which the device performance information of the particular MFP 10 is not stored in the device performance information DB 204 included in the smart device 20.

First, at Step S300, in the same manner as Step S200 described above, the smart device 20 displays the function selection screen 400 on the display, and, if, for example, the button 411a for selecting the print function is operated, displays the file selection screen on the display to prompt to select a document to be printed. After a document is selected according to an operation on the file selection screen, the smart device 20 displays the common item setting screen 410 of FIG. 10 on the display, and, according to user operations on the common item setting screen 410, sets the print parameters.

After the print parameters are set on the common item setting screen 410, the smart device 20 displays the operation guide screen 420 illustrated in FIG. 11 on the display. When, in response to this display, the user holds the smart device 20 over the position of the IC tag of the particular MFP 10 (Step S301), the near field communication starts between the smart device 20 and the IC tag of the MFP 10. Using the near field communication, the smart device 20 acquires the communication information 105 from the storing unit 103 in the IC tag (Steps S302 and S303).

The smart device 20 extracts the model ID from the communication information 105 acquired at Step S303, and searches the device performance information DB 204 for the device performance information 104 corresponding to the extracted model ID. If the device performance information 104 corresponding to the extracted model ID is not found in the device performance information DB 204, the smart device 20 connects to the same network 30 as connected to the particular MFP 10 based on the communication information 105 acquired at Step S303, in the manner described using FIG. 15 (Step S304), and requests the device performance information 104 from the MFP 10 (Step S305). In response to the request, the MFP 10 sends the device performance information 104 stored, for example, in the ROM 1001 or the HDD 1020 to the smart device 20 via the network 30 (Step S306).

The smart device 20 acquires the device performance information 104 sent from the MFP 10, and stores the acquired device performance information 104, for example, in the device performance information DB 204 in the storing unit 203 in a manner associated with the model ID included in the communication information 105 acquired at Step S303 described above (Step S307).

After storing the device performance information 104 acquired from the MFP 10 in the device performance information DB 204 in a manner associated with the model ID, the smart device 20 follows the process at Step S17 of FIG. 8 to determine, based on the model ID, whether the device performance information 104 associated with the model ID includes a specific item (or items). If it is determined that the device performance information 104 includes a specific item (or items), the smart device 20 displays the alert display 431 and the specific item setting screen 430 illustrated in FIG. 12 on the display (Step S308). According to an operation (or operations) on the specific item setting screen 430, the setting(s) of the specific item (or items) is (are) made (Step S309).

The smart device 20 is connected to the particular MFP 10 via the network 30 at Step S304 described above. In that state, the smart device 20 sends a print request to the particular MFP 10 via the network 30 (Step S310). In response to the print request, the MFP 10 performs printing (Step S311).

Thus, according to the first modification of the first embodiment, even if the smart device 20 has not stored in advance the device performance information 104 of the particular MFP 10, the smart device 20 can set the item (or items) specific to the particular MFP 10, and instruct the printing.

Second Modification of First Embodiment

A second modification of the first embodiment will be described. The processing according to the first embodiment has been described above to be executed, for example, by standalone application software (hereinafter, called an application) that is invoked from the function selection screen 400 illustrated in FIG. 9. The processing is, however, not limited to this example. In other words, the processing according to the first embodiment can be executed by being invoked from another application.

Figure 18:
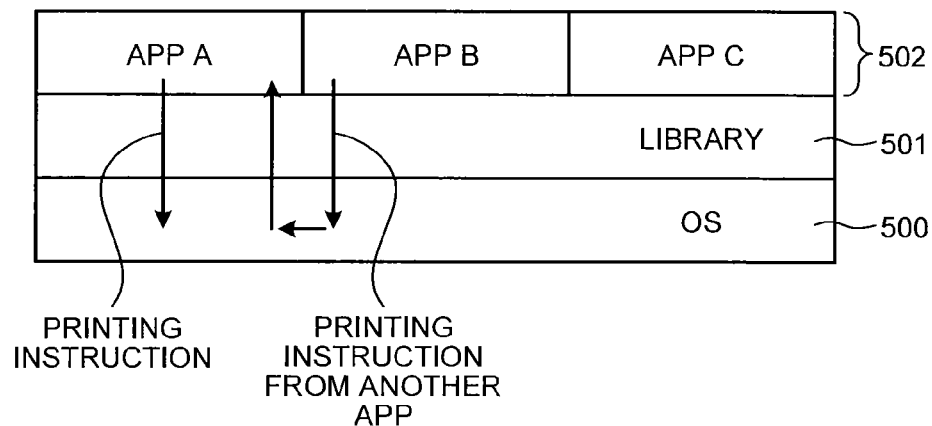
FIG. 18 is a diagram illustrating an example of the architecture of software in the smart device according to the first embodiment.

FIG. 18 illustrates an example of the architecture of the software in the smart device 20. A layer above an operating system (OS) 500 is a library 501, and a layer above the library 501 consists of an application layer 502 including applications A, B, C, and so on. To use a function of another application, each of the applications A, B, C, and so on sends a start request for a part of the other application with the function to be used, such as a part including the function to be used, to the OS 500 via the library 501. In response to the request, the OS 500 starts the part of the other application via the library 501.

For example, assume that the application A is an application that executes the processing according to the first embodiment, and consider a case in which the other application B performs printing using the particular MFP 10. In this case, the application A is first registered in advance in the OS 500 and the library 501 as an application that performs printing in the MFP 10 via the network 30. If the application B selects, for example, printing of a document, a printing instruction is output from the application B and sent to the OS 500 via the library 501. The OS 500 sends the received printing instruction to the registered application A.

After receiving the printing instruction from the application B, the application A follows, for example, the above-described processing at Step S14 of FIG. 8 to display the common item setting screen 410 illustrated in FIG. 10 on the display of the smart device 20. Subsequently, the application A executes the processing of Step S15 and later in FIG. 8 to acquire the communication information 105 from the particular MFP 10 intended to perform printing and determine whether the MFP 10 includes a specific item (or items), and furthermore, establishes the communication with the particular MFP 10 via the network 30. If the particular MFP 10 includes a specific item (or items), the application A displays the alert display 431 and the specific item setting screen 430 illustrated in FIG. 12. After the various print parameters are set by user operations, the application A transfers the printing instruction to the OS 500.

Having a configuration such as that of the second modification of the first embodiment allows the various applications installed on the smart device 20 to easily use the functions of the particular MFP 10 connected to the smart device 20 via the network 30, thus improving convenience of the user.

Second Embodiment

A second embodiment of the present invention will be described. The first embodiment and the modifications thereof described above allow the smart device 20 to use the functions of the MFP 10 by storing the communication information 105 including the model ID of the particular MFP 10 in the IC tag that is configured as a device external to the MFP 10, and performing the near field communication between the IC tag and the smart device 20. The second embodiment has instead a configuration in which the communication information 105 is stored in the storing unit embedded in the MFP 10, and, in addition, a near field wireless connection unit is embedded in the MFP 10.

Figure 19:
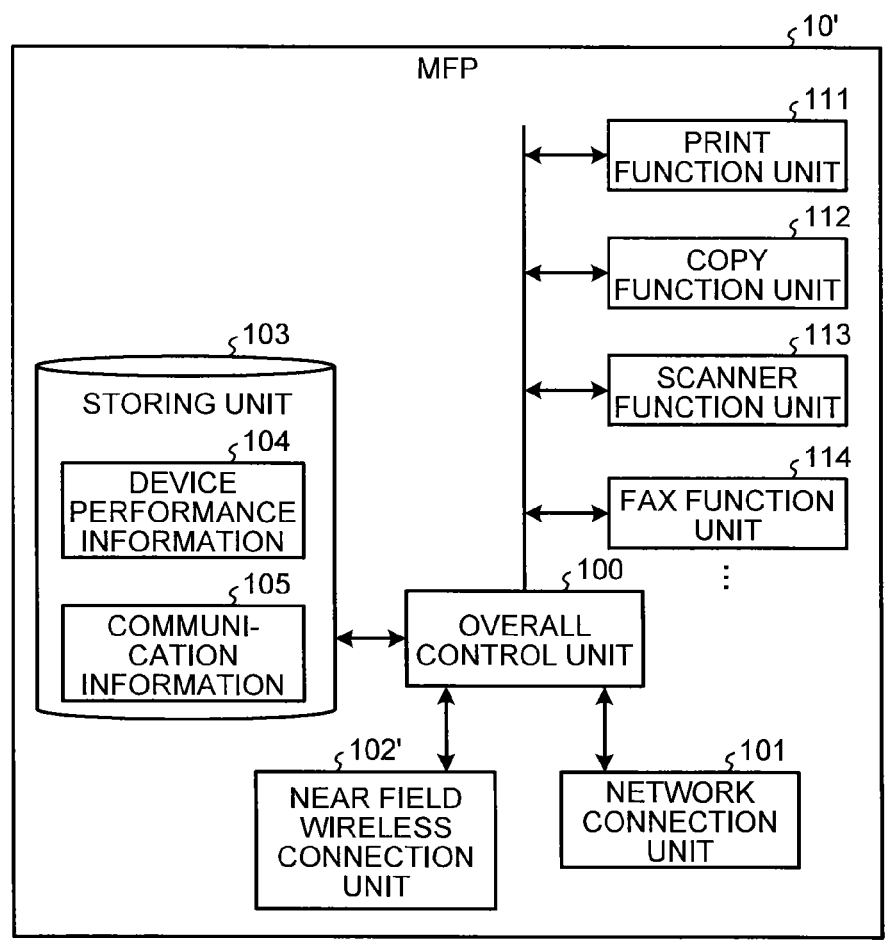
FIG. 19 is a functional block diagram of an example for explaining functions of an MFP according to a second embodiment of the present invention.

FIG. 19 is a functional block diagram of an example for explaining functions of an MFP according to the second embodiment. In FIG. 19, the same reference numerals are given to parts in common with those of FIG. 2 explained above, and detailed description thereof will be omitted.

In FIG. 19, in this MFP 10', a near field wireless connection unit 102' for performing the near field communication and the storing unit 103 storing the communication information 105 are connected to the overall control unit 100. In FIG. 19, the storing unit 103 also stores therein the device performance information 104. A position in the MFP 10' that allows easy near field communication with the smart device 20 is selected as a mounting position of the NFC R/W 1051 (refer to FIG. 20) used by the near field wireless connection unit 102' to perform the communication.

Figure 20:
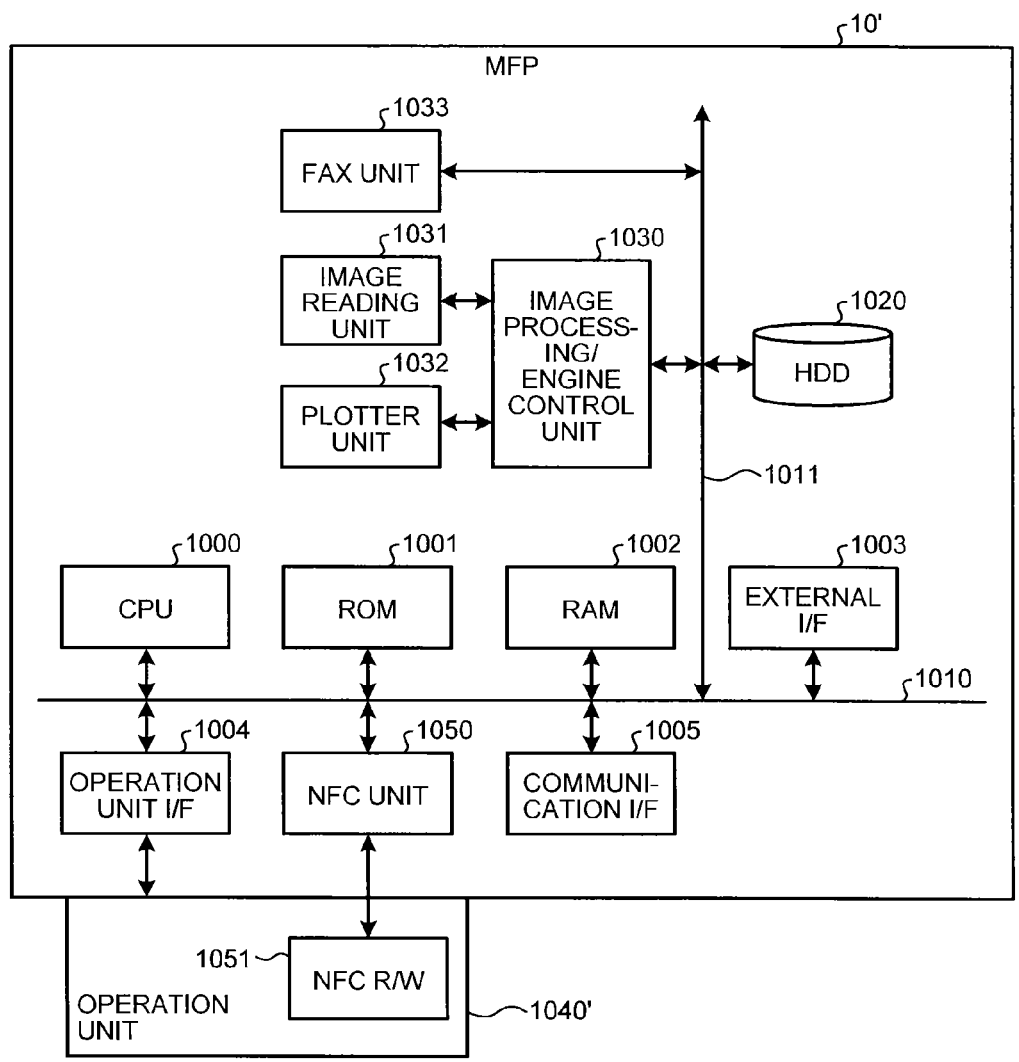
FIG. 20 is a block diagram illustrating an example of the hardware configuration of the MFP according to the second embodiment.

FIG. 20 illustrates an example of the hardware configuration of the MFP 10' according to the second embodiment. In FIG. 20, the same reference numerals are given to parts in common with those of FIG. 6 explained above, and detailed description thereof will be omitted.

In FIG. 20, the MFP 10' is provided with an NFC unit 1050 and an NFC reader/writer (R/W) 1051 instead of the NFC chip 1041 of FIG. 6. In the example of FIG. 20, the NFC R/W 1051 is provided in an operation unit 1040'. The NFC unit 1050 includes a memory and a communication control unit for the near field communication. The NFC R/W 1051 includes an antenna for performing the near field communication. The NFC R/W 1051 performs start control of the NFC unit 1050, and reads and writes data from/to the memory included in the NFC unit 1050.

The configuration of the second embodiment allows the MFP 10' and the smart device 20 to bi-directionally communicate with each other via the near field communication. For example, when the smart device 20 performs the near field communication with a particular MFP 10', the smart device 20 notifies the particular MFP 10' of a function selected on the smart device 20. In response to the notification, the particular MFP 10' extracts only a part of the device performance information 104 corresponding to the function given notice of from the device performance information 104 representing all functions of the particular MFP 10', and stores the extracted information in a storage area for near field communication that stores therein information to be sent via the near field communication. For example, the memory in the NFC unit 1050 can be used as the storage area for near field communication. This is not limited to the memory, but the RAM 1002 or the HDD 1020 may be used as the storage area for near field communication.

FIG. 21 illustrates an example of the information stored in the storage area for near field communication according to the second embodiment. The following description assumes that the scan function is selected on the smart device 20. FIG. 21 illustrates an example in which the device performance information 104 for the scan function specified by the smart device 20 is stored together with the communication information 105 in the storage area for near field communication. Information corresponding to a function selected on the smart device 20 is dynamically set as the device performance information 104 in FIG. 21 in the storage area for near field communication.

During the near field communication with the smart device 20, the particular MFP 10' sends, to the smart device 20, the device performance information 104 for the scan function and the communication information 105 that are stored in the storage area for near field communication. The smart device 20 stores in advance the device performance information 104 representing functions common to a plurality of MFPs 10', and compares the device performance information 104 representing the common functions with the device performance information 104 sent from the particular MFP 10' to extract information representing a specific item (or items) included in the device performance information 104 sent from the particular MFP 10'.

With the configuration described above, the smart device 20 needs to store only the device performance information 104 common to a plurality of MFPs 10', so that the capacity of the storing unit 203 can be reduced. The quantity of information transmitted via the near field communication can also be reduced by sending only the device performance information 104 for the selected function, together with the communication information 105.

FIG. 22 illustrates an example of communication processing according to the second embodiment. A description will be given of an example of using the scan function in the particular MFP 10' from the smart device 20. The user first sets a document to be scanned on the particular MFP 10' (Step S400). The user performs certain operations on the smart device 20, whereby the function selection screen 400 is displayed on the display of the smart device 20.

The user performs an operation of selecting the scan function, and, in response to the operation, the smart device 20 displays the common item setting screen for the scan function that corresponds to the common item setting screen 410 displayed in FIG. 10 when the print function of FIG. 10 is selected. According to user operations on the common item setting screen for the scan function, the smart device 20 sets parameters for scanning (Step S401).

After the scan parameters are set on the common item setting screen for the scan function, the smart device 20 displays the operation guide screen 420 illustrated in FIG. 11 on the display. When, in response to this display, the user holds the smart device 20 at the communication position (position of the NFC R/W 1051) of the particular MFP 10' (Step S402), the near field communication starts between the smart device 20 and the NFC R/W 1051 of the MFP 10'. Using the near field communication, the particular MFP 10' requests information representing the selected function from the smart device 20 (Step S403). In response to the request, the smart device 20 sends the information representing that the scan function is selected to the particular MFP 10' via the near field communication (Step S404).

In response to the notice on function sent from the smart device 20 at Step S404, the particular MFP 10' extracts only a part of the device performance information 104 related to the scan function from the device performance information 104, and stores the extracted part of the device performance information 104 in the storage area for near field communication (Step S405). The storage area for near field communication already stores therein the communication information 105.

The smart device 20 requests the device performance information 104 from the particular MFP 10' via the near field communication (Step S406). In response to the request, the particular MFP 10' sends the device performance information 104 for the scan function and the communication information 105 that are stored in the storage area for near field communication, to the smart device 20, via the near field communication (Step S407).

The smart device 20 compares the device performance information 104 for the scan function sent from the particular MFP 10' with the common device performance information related to the scan function stored in advance in the storing unit 203, and determines whether the particular MFP 10' includes a specific item (or items) for the scan function. If it is determined that the particular MFP 10' includes a specific item, the smart device 20 displays an alert display and the specific item setting screen for the scan function on the display (Step S408). According to an operation (or operations) on the specific item setting screen 430, the specific item (or items) is (are) set (Step S409).

Figure 23:
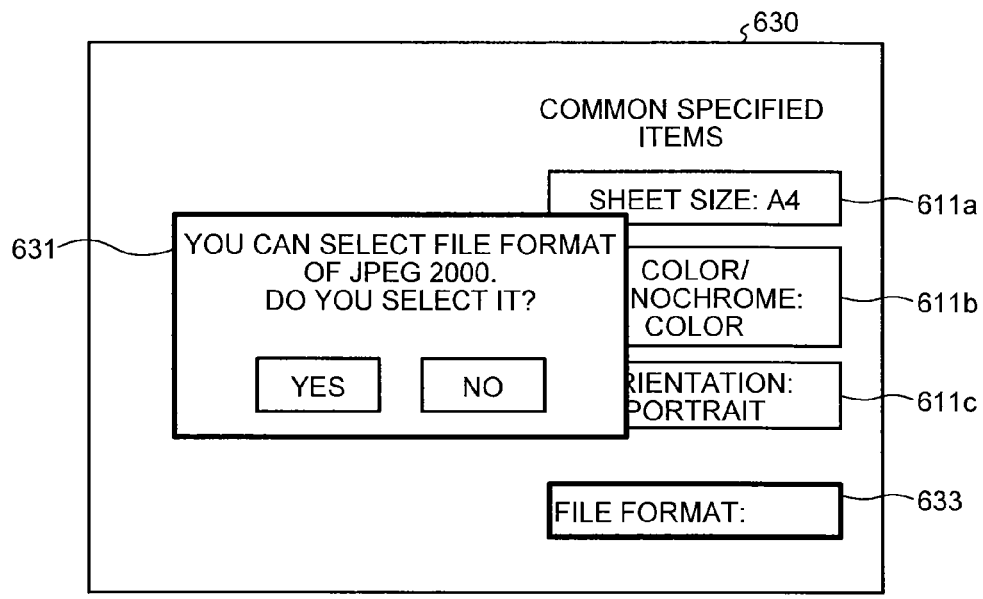
FIG. 23 is a diagram illustrating an example of an alert display according to the second embodiment.

FIG. 23 illustrates an example of the alert display for the scan function according to the second embodiment. In FIG. 23, a common item setting screen 630 is provided with buttons 611a, 611b, and 611c for setting common specified items that can be specified in common among the models for the scan function, and also provided with a button 633. The button 633 is a button for specifying a file format in which image data obtained using the scan function is saved. For example, operating the button 633 displays a file format selection screen for specifying a file format to save in.

In the example of FIG. 23, an alert display 631 is also displayed on the common item setting screen 630. In this example, the alert display 631 is provided with a message that identifies the specific item for the scan function of the MFP 10' and prompts to select whether to make a setting for the specific item, and also provided with buttons for performing the selection. In the example of FIG. 23, the alert display 631 shows a question of whether to select a file format of "JPEG 2000" as the specific item for the scan function of the MFP 10'.

In the example of FIG. 23, if an operation is performed on the alert display 631 to choose to execute the selection of the specific item, that is, the file format of "JPEG 2000", an item for selecting the file format of "JPEG 2000" that is specific to the model of the MFP 10' is added to the selection items for file formats that are common to the other models, on the file format selection screen that is displayed, for example, by operating the button 633.

Based on the communication information 105 acquired at Step S407, the smart device 20 connects to the same network 30 as connected to the particular MFP 10', in the manner as described using FIG. 15 (Step S410). The smart device 20 requests the particular MFP 10' via the network 30 to perform a scan operation (Step S411). In response to this operation start request, the particular MFP 10' performs the scan operation (Step S412).

The second embodiment can be combined with the execution from another application according to the second modification of the first embodiment described above.

The above embodiments have been described on the assumption that the smart device 20 uses the communication information 105 acquired from the MFP 10 or the MFP 10' via the near field communication to perform communication with the MFP 10 or the MFP 10' via the network 30. The present invention is, however, not limited to this example. The smart device 20 may communicate with the MFP 10 or the MFP 10' not via the network 30, but via a wireless communication, such as a communication using Wi-Fi Direct (registered trademark) or Bluetooth (registered trademark).

The first embodiment, the modifications of the first embodiment, and the second embodiment have been described above on the assumption that the smart device 20 uses the functions of the MFP 10 that visualizes image data by forming an image on the medium intended for forming an image thereon according to the image data. The present invention is, however, not limited to this example. The first embodiment, the modifications of the first embodiment, and the second embodiment as described above can be applied to a case in which the smart device 20 uses, for example, functions of a projector that visualizes image data by converting the image data into light using a light modulation device and projecting the light onto a projection target medium.

Third Embodiment

Figure 24:
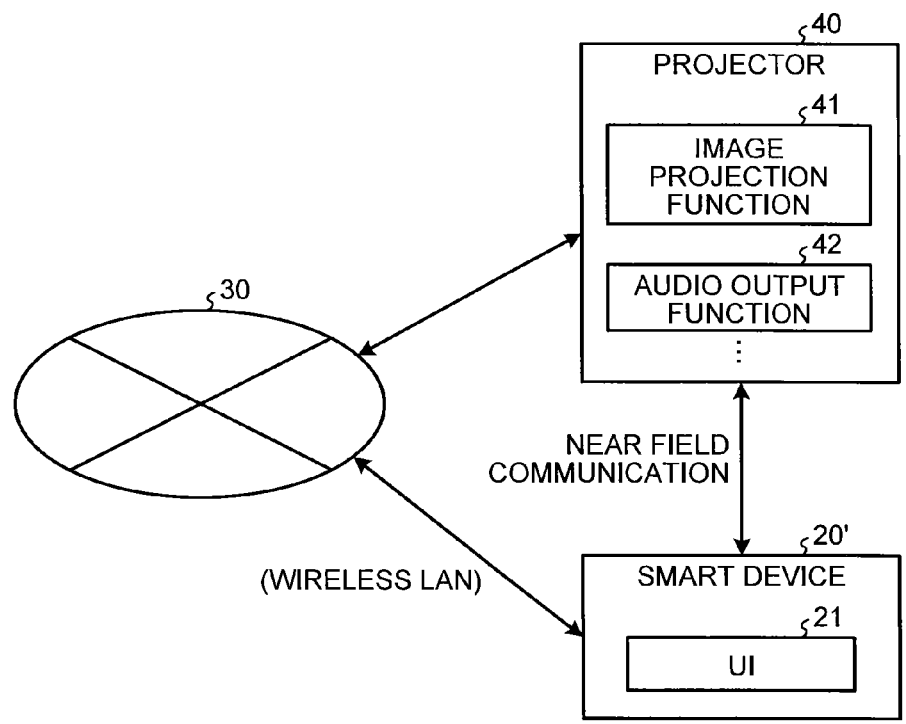
FIG. 24 is a diagram schematically illustrating an image processing system according to a third embodiment of the present invention.

A third embodiment of the present invention will be described. FIG. 24 schematically illustrates an image processing system according to the third embodiment. In FIG. 24, the same reference numerals are given to parts in common with those of FIG. 1 explained above, and detailed description thereof will be omitted. As illustrated in FIG. 24, the third embodiment is an example obtained by replacing the MFP 10 in the image processing system according to the first embodiment described using FIG. 1 with a projector 40. The projector 40 is an image visualization device that has a function of converting externally supplied image data into a projection image and projecting the projection image so as to display (visualize) the image data on the projection target medium.

In FIG. 24, the projector 40 includes an image projection function 41 and an audio output function 42. The projector 40 is connected to the network 30 using, for example, a LAN so as to be capable of wiredly or wirelessly communicating therewith. A smart device 20' is obtained by adding an audio processing function to the smart device 20 described above.

Figure 25:
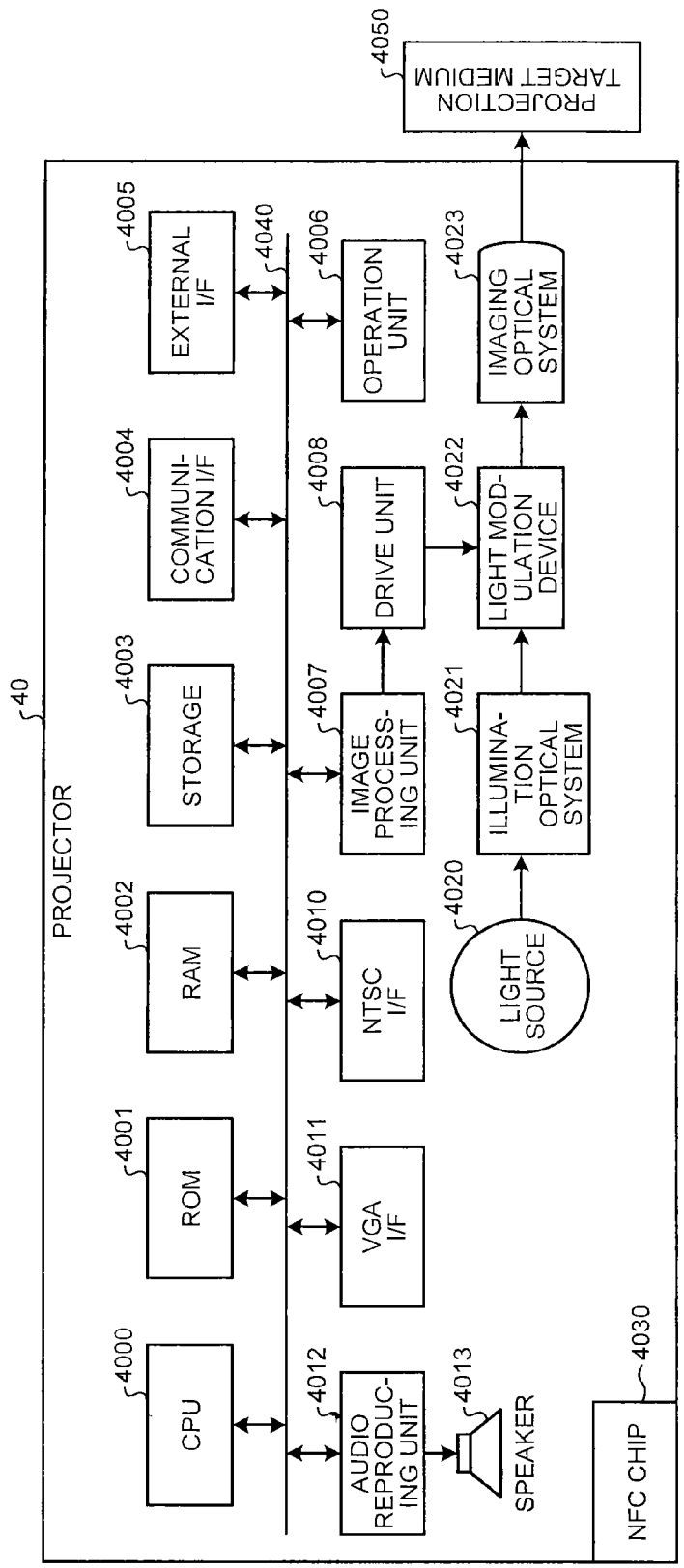
FIG. 25 is a block diagram illustrating an example of the hardware configuration of a projector according to the third embodiment.

FIG. 25 illustrates an example of the hardware configuration of the projector 40 according to the third embodiment. The projector 40 includes a CPU 4000, a ROM 4001, a RAM 4002, a storage 4003, a communication I/F 4004, an external I/F 4005, and an operation unit 4006. The projector 40 also includes an image processing unit 4007, a drive unit 4008, an interface according to the National Television System Committee (NTSC I/F) 4010, a video graphics array interface (VGA I/F) 4011, and an audio reproducing unit 4012. The above-mentioned units included in the projector 40 are connected via a bus 4040 so as to be capable of communicating with each other.

The projector 40 further includes a light source 4020, an illumination optical system 4021, a light modulation device 4022, an imaging optical system 4023, and a speaker 4013.

The storage 4003 is, for example, a flash memory or a hard disk drive, and can store therein data in a nonvolatile manner. The CPU 4000 follows a computer program stored in advance in the ROM 4001 and uses the RAM 4002 as a work memory to control the operation of the projector 40. The storage 4003 stores therein, for example, setting data for operating the projector 40. The storage 4003 may also store therein a computer program for operating the CPU 4000.

The communication I/F 4004 follows commands of the CPU 4000 to control the communication with the network 30. The external I/F 4005 is an interface, such as a USB interface, for connecting to external devices. The audio reproducing unit 4012 converts audio data supplied via the bus 4040 into an audio signal in an analog form through a digital-to-analog (D/A) conversion, then performs certain audio processing including amplification processing, and drives the speaker 4013. While the example of FIG. 25 illustrates that the projector 40 incorporates the speaker 4013, the present invention is not limited to this example. The speaker 4013 may be, for example, connected as an external device to the projector 40.

The VGA I/F 4011 receives externally supplied video signals conforming to the video graphics array (VGA) standard (hereinafter, called VGA video signals), then converts the VGA video signals into image data represented by digital video signals of red, green, and blue (RGB) colors through an analog-to-digital (A/D) conversion, and outputs the image data to the bus 4040. The NTSC I/F 4010 A/D-converts externally supplied National Television System Committee (NTSC) type video signals (hereinafter, called NTSC video signals), then further converts the composite signals into image data represented by digital video signals of RGB colors, and outputs the image data to the bus 4040. The types of video signals supported by the projector 40 are not limited to the VGA type and the NTSC type.

The operation unit 4006 is provided with various operation elements for the user to operate the projector 40. For example, the operation unit 4006 is provided with a power button for switching on and off the projector 40 and an input signal switching button for switching the input path of image data and other buttons. The input signal switching button is a button for switching the input path of image data, for example, among the VGA I/F 4011, the NTSC I/F 4010, the network 30 (communication I/F 4004), and the external I/F 4005.

The image processing unit 4007 generates image signals for projection from the image data received via the bus 4040. Based on the image signals for projection received from the image processing unit 4007, the drive unit 4008 generates drive signals for driving the light modulation device 4022. For example, a transmissive liquid crystal display (LCD) can be used as the light modulation device 4022. The type of the light modulation device usable for the projector 40 is not limited to the LCD type. When the LCD is used as the light modulation device 4022, the drive unit 4008 controls on and off of transmission of light for each pixel of the LCD according to the image data.

The illumination optical system 4021 includes, for example, a plurality of lenses, and irradiates the light modulation device 4022 with light emitted from the light source 4020. By being driven by the drive unit 4008, the light modulation device 4022 modulates the light emitted from the illumination optical system 4021 to convert the light into light of the projection image according to the image data, and emits the converted light. The imaging optical system 4023 includes, for example, a plurality of lenses, and irradiates a projection target medium 4050 with the light of the projection image coming from the light modulation device 4022 so as to project the projection image onto the projection target medium 4050 in an enlarging manner.

An NFC chip 4030 is an IC tag having the function of the near field communication described above, and includes a memory and a communication unit for performing the near field communication. The NFC chip 4030 is a device external to the projector 40, and is, for example, pasted to the projector 40.

Figures 26, 27:
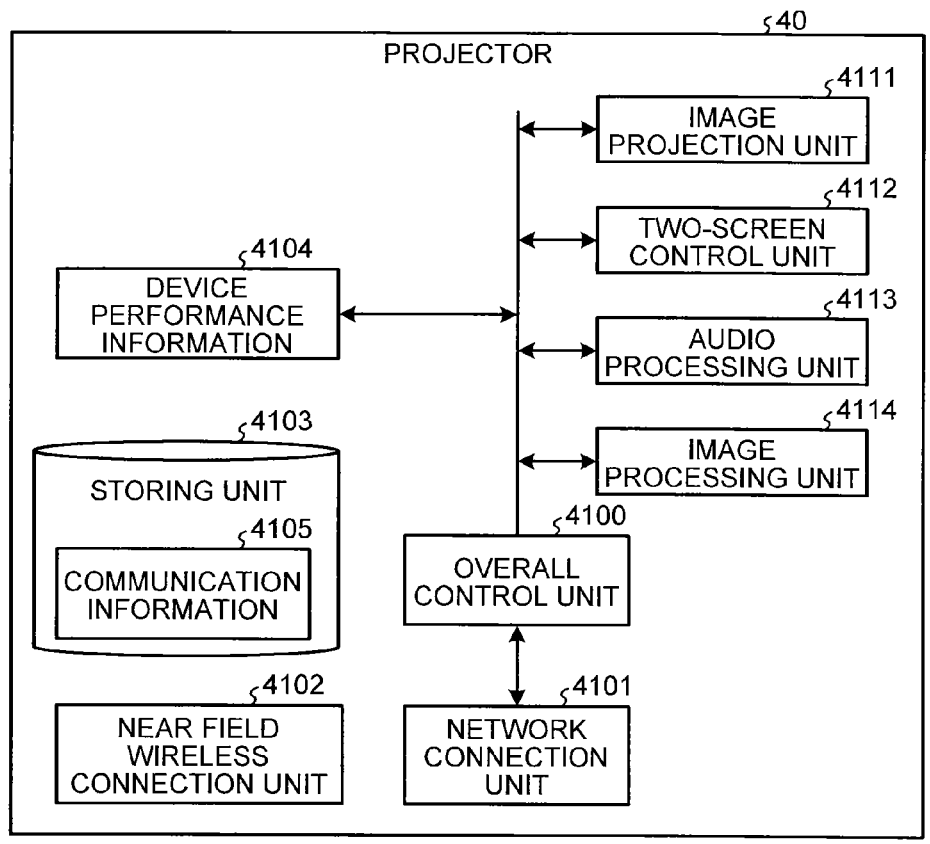
FIG. 26 is a functional block diagram for explaining functions of the projector according to the third embodiment.
FIG. 27 is a diagram illustrating an example of device performance information according to the third embodiment.

FIG. 26 is a functional block diagram for explaining the functions of the projector 40 according to the third embodiment. As illustrated in FIG. 26, the projector 40 includes an overall control unit 4100, a network connection unit 4101, a near field wireless connection unit 4102, a storing unit 4103, device performance information 4104, an image projection unit 4111, a two-screen control unit 4112, an audio processing unit 4113, and an image processing unit 4114.

The overall control unit 4100 includes the CPU 4000, the ROM 4001, the RAM 4002, and the storage 4003. In the overall control unit 4100, the CPU 4000 follows a computer program stored in advance in the ROM 4001 and uses the RAM 4002 as a work memory to control the overall operation of the projector 40 with reference to the setting data stored in the storage 4003.

The image projection unit 4111 implements the function of projecting the image based on the image data, as the projection image, out of the projector 40. The two-screen control unit 4112 implements a function of combining pieces of image data supplied from two external devices so as to simultaneously project two images based on the pieces of image data into one projection image. For example, the two-screen control unit 4112 combines the pieces of image data supplied from the two external devices so as to arrange the images based on the pieces of image data side by side into one image.

Hereinafter, the projection method of simultaneously projecting the two images into one projection image is called two-screen display, and a projection method of projecting one image into one projection image is called one-screen display.

The audio processing unit 4113 implements the function of converting the audio data into a signal in a form that can drive the speaker 4013. For example, the audio processing unit 4113 converts the audio data into the audio signal in the analog form through the D/A conversion, and drives the speaker 4013.

The image processing unit 4114 applies certain image processing to image data. The image processing unit 4114 can apply, for example, image processing, such as decoding processing, to image data supplied from external devices.

In the third embodiment, the near field wireless connection unit 4102 and the storing unit 4103 are provided in the NFC chip 4030, which is pasted to the housing of the projector 40. The storing unit 4103 stores in advance communication information 4105 to be used when the smart device 20' performs the communication with the projector 40 via the network 30. The near field wireless connection unit 4102 can read the communication information 4105 from the storing unit 4103 according to a request received via the near field communication, and can send the communication information 4105 to a communication partner of the near field communication.

When the user holds the smart device 20' near the position of the NFC chip 4030 of the projector 40, the near field communication is performed between the smart device 20' and the NFC chip 4030. Using the near field communication, the smart device 20' can, for example, read information stored in the storing unit 4103 of the NFC chip 4030.

The storing unit 4103 of the NFC chip 4030 stores in advance a model ID serving as identification information that can identify the model of the projector 40 and the communication information 4105 to be used by the smart device 20' for communicating with the projector 40 via the network 30. The communication information 4105 includes, for example, the items of the communication information 105 described using FIG. 4.

The device performance information 4104 corresponds to the device performance information 104 described in the first embodiment. FIG. 27 illustrates an example of the device performance information 4104 according to the third embodiment. FIG. 27 illustrates the device performance information 4104 such that settable performance information on the functions (the image projection function and the audio output function) of the projector 40 is associated with the model ID for identifying the projector 40. The settable performance information is information for each of the models of the projector 40, and may vary depending on the model of the projector 40.

In the example of FIG. 27, items of "One-Screen Display" and "Two-Screen Display" are defined as the settable performance information for the image projection function.

Figure 28:
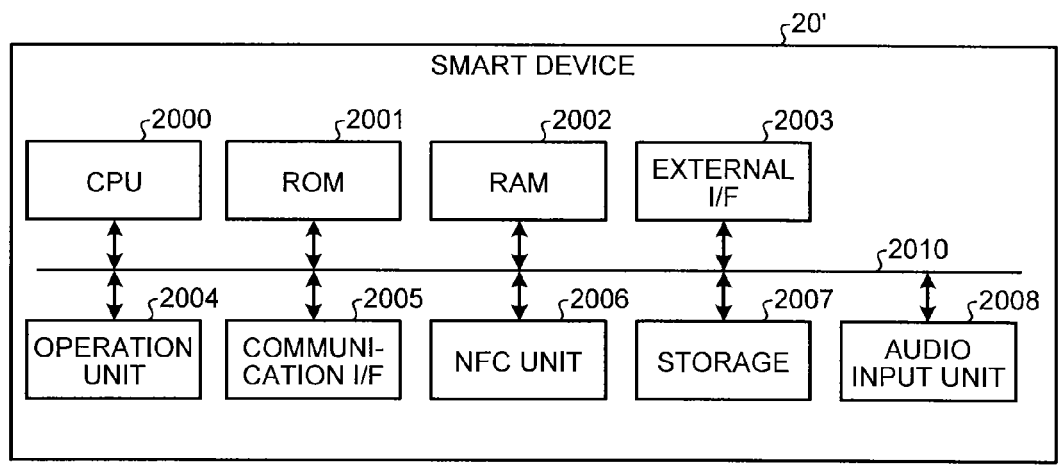
FIG. 28 is a block diagram illustrating an example of the hardware configuration of a smart device according to the third embodiment.

The smart device 20' according to third embodiment will be described. FIG. 28 illustrates an example of the hardware configuration of the smart device 20' according to the third embodiment. In FIG. 28, the same reference numerals are given to parts in common with those of FIG. 7 explained above, and detailed description thereof will be omitted.

As illustrated in FIG. 28, the smart device 20' according to the third embodiment has a configuration obtained by adding an audio input unit 2008 to the configuration of the smart device 20 according to the first embodiment. The audio input unit 2008 includes, for example, a microphone, and, after converting an audio signal in the analog form output from the microphone into audio data through the A/D conversion, outputs the audio data to the bus 2010. The present invention is not limited to this, but the audio input unit 2008 may read audio data stored in the storage 2007 and output the audio data to the bus 2010, or may synthesize audio data and output it. The audio input unit 2008 may further have a function of encoding the audio data into a compressed form.

Figure 29:
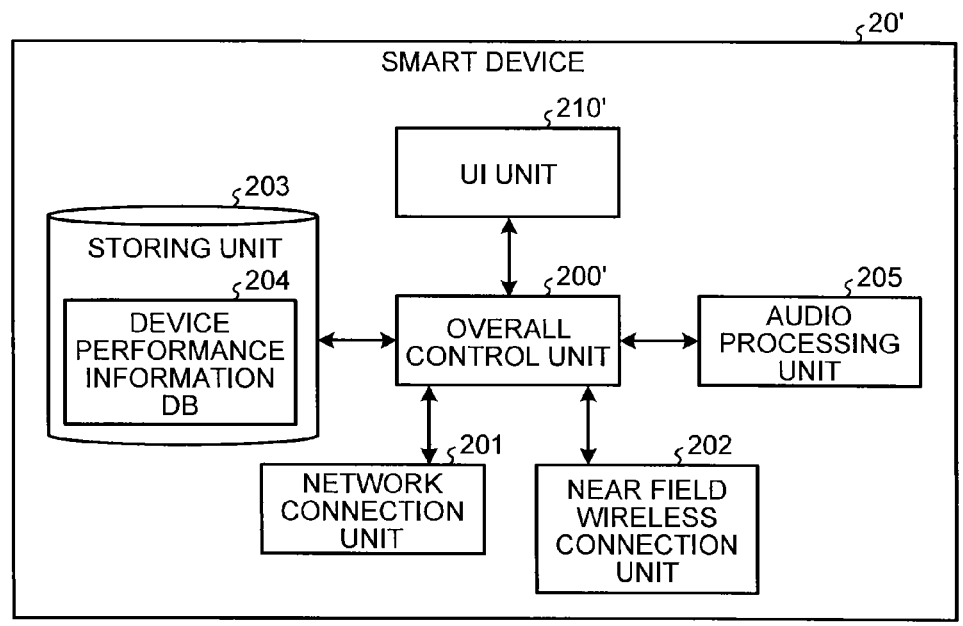
FIG. 29 is a functional block diagram of an example illustrating functions of the smart device according to the third embodiment.

FIG. 29 is a functional block diagram of an example illustrating functions of the smart device 20' according to the third embodiment. In FIG. 29, the same reference numerals are given to parts in common with those of FIG. 5 explained above, and detailed description thereof will be omitted. As illustrated in FIG. 29, the smart device 20' according to the third embodiment has an audio processing unit 205 of processing the audio data in addition to the functions of the smart device 20 according to the first embodiment. The audio processing unit 205 includes the A/D conversion function of converting the audio signal in the analog form into the audio data and the function of encoding the audio data into a compressed form. On the smart device 20' according to the third embodiment, an overall control unit 200' and a UI unit 210' have slightly different functions from those of the overall control unit 200 and the UI unit 210, respectively, in the smart device 20 according to the first embodiment.

The smart device 20' stores in advance, in the device performance information DB 204 in the storing unit 203, the settable device performance information 4104 of the projector 40, for one or more models of the projector 40, in a manner associated with the model ID or IDs.

If the device performance information DB 204 stores therein the device performance information 4104 of a plurality of models of the projector 40, the smart device 20' extracts settable device performance information common to pieces of the device performance information 4104 of the models of the projector 40 based on the stored device performance information 4104. Based on the model ID acquired from the projector 40 via the near field communication, the smart device 20' searches the device performance information DB 204 for the device performance information 4104 associated with the model ID. If the device performance information 4104 read from the device performance information DB 204 includes settable device performance information of a specific item (or items) that is (are) not included in the settable device performance information common to the pieces of the device performance information of the models of the projector 40, the smart device 20' displays the settable device performance information of the specific item (or items) on the UI unit 210'.

The functions of the overall control unit 200', the network connection unit 201, the near field wireless connection unit 202, and the UI unit 210' included in the smart device 20' are implemented by a computer program operated on the CPU 2000. This program is called a projector application program (hereinafter, abbreviated as projector app). The projector application may further include the function of the audio processing unit 205.

The projector application according to the third embodiment is not limited to the example of being stored in advance in the ROM 2001, but may be configured to be provided by being stored on a computer connected to a communication network, such as the Internet, and being downloaded via the communication network. The projector application may also be provided or distributed via a communication network, such as the Internet.

Figure 30:
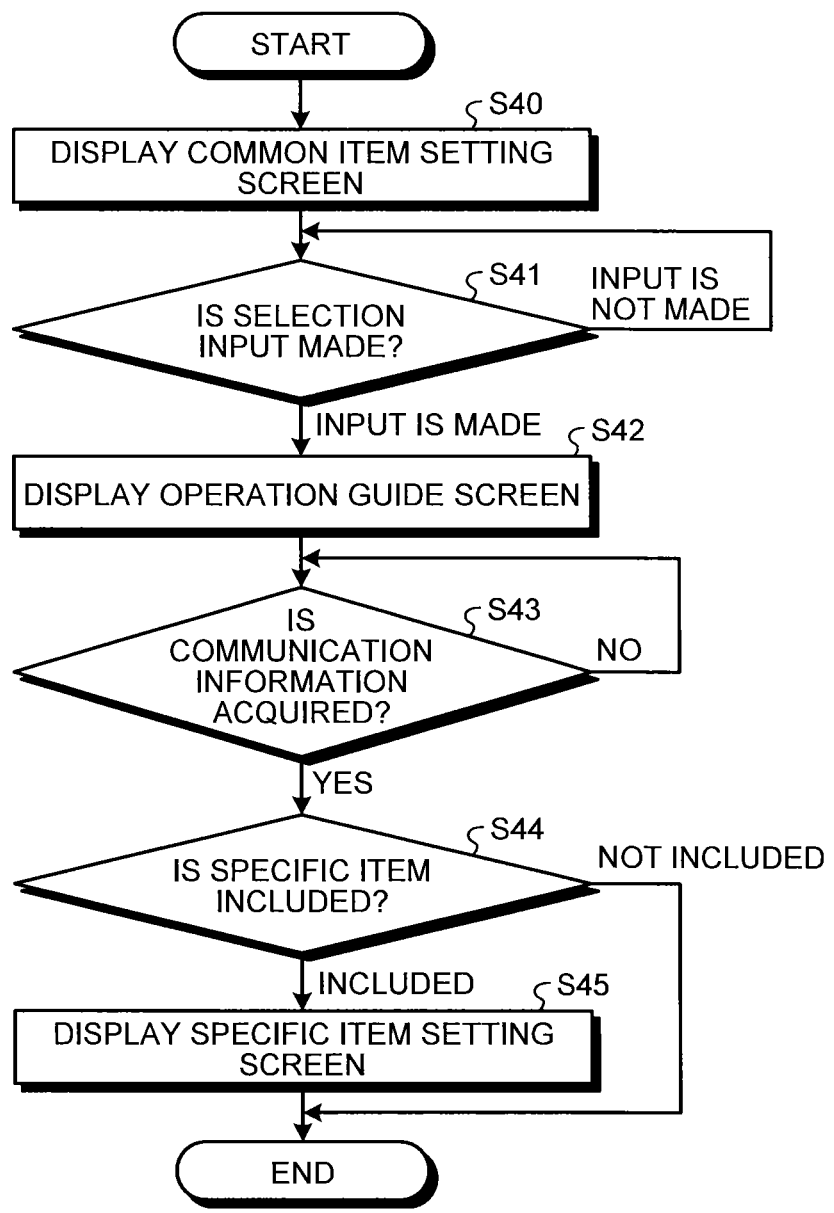
FIG. 30 is a flowchart illustrating an example process in the smart device according to the third embodiment.

The processing according to the third embodiment will be more specifically described. FIG. 30 illustrates a flowchart of an example process in the smart device 20' according to the third embodiment. An example will be described in which a user A uses a function of a particular projector 40 from the smart device 20' held by the user A.

Prior to the processing of the flowchart in FIG. 30, the user A operates the smart device 20' to start the projector application, and select a file that stores image data to be projected using the particular projector 40, for example, from files stored in the storage 2007 included in the smart device 20'.

Figure 31:
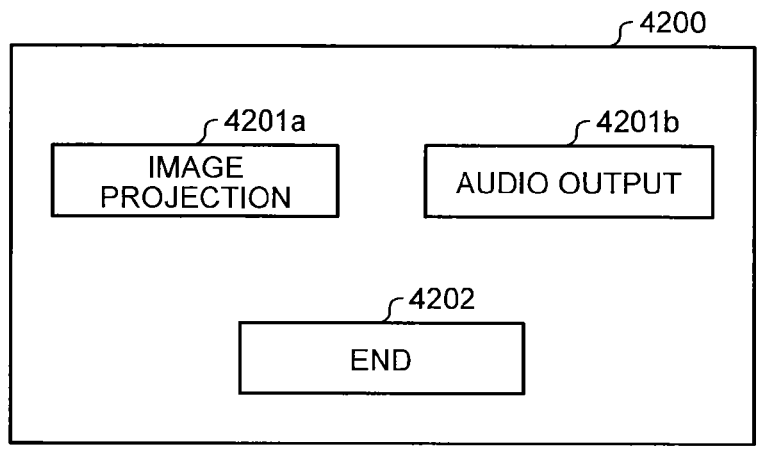
FIG. 31 is a diagram illustrating an example of a common item setting screen according to the third embodiment.

In the flowchart of FIG. 30, at Step S40, the UI unit 210' displays the common item setting screen for making settings common to a plurality of models, on the display of the operation unit 2004. FIG. 31 illustrates an example of the common item setting screen. In FIG. 31, this common item setting screen 4200 is provided with buttons 4201*a* and 4201*b* for setting common specified items that can be specified in common among the models. Pressing an end button 4202 notifies the UI unit 210' of an end of making the various settings on the common item setting screen 4200.

On the common item setting screen 4200, the button 4201*a* is an image projection button for specifying projection display of an image based on the image data sent from the smart device 20', and the button 4201*b* is an audio output button for specifying output of a sound from the speaker 4013 based on the audio data sent from the smart device 20'. Either one or both of the buttons 4201*a* and 4201*b* may be operated. To perform both the image projection and the audio output, both of the buttons 4201*a* and 4201*b* are operated.

The UI unit 210' waits for a selection input of a function by operations of the buttons 4201*a* and 4201*b*, and the end button 4202 (Step S41). If determining that the selection input of a function is not made, the UI unit 210' returns the process to Step S41. If at least one of the buttons 4201*a* and 4201*b* is operated and then the end button 4202 is operated, the UI unit 210' determines that the selection input of a function is made, and performs processing at Step S42.

Figure 32:
FIG. 32 is a diagram illustrating an example of an operation guide screen according to the third embodiment for prompting to start the near field communication.

For example, if the user A operates the button 4201*a* and then the end button 4202, the UI unit 210' determines that the selection input of a function is made, and performs the processing at Step S42. At Step S42, the UI unit 210' displays, on the display of the operation unit 2004, an operation guide screen 4210 for prompting to start the near field communication, as illustrated in FIG. 32. In the example of FIG. 32, the operation guide screen 4210 displays a message 4211 prompting to start the near field communication.

On the smart device 20', the UI unit 210' determines whether the communication information 4105 is acquired from the storing unit 4103 in the IC tag via the near field communication performed with the IC tag (NFC chip 4030) of the projector 40 (Step S43). The UI unit 210' repeats the processing of Step S43 until the communication information 4105 is acquired from the IC tag.

For example, when the user A holds the smart device 20' near the position of the IC tag, the near field communication is performed between the smart device 20' and the IC tag, and the UI unit 210' acquires the communication information 4105 and the model ID from the storing unit 4103 in the IC tag. If it is determined that the communication information 4105 is acquired, the UI unit 210' performs processing at Step S44.

At Step S44, the UI unit 210' determines whether the particular projector 40 includes a specific item (or items). For example, based on the acquired model ID, the UI unit 210' searches the device performance information DB 204 stored in the storing unit 203 for the device performance information 4104 corresponding to the model ID. If the device performance information DB 204 stores a plurality of pieces of the device performance information 4104 for a plurality of model IDs, the UI unit 210' extracts the settable performance information common to the pieces of the device performance information.

The UI unit 210' compares the settable performance information common to the extracted pieces of the device performance information with the settable performance information included in the device performance information 4104 found based on the model ID acquired via the near field communication. As a result of this comparison, the UI unit 210' acquires, as the specific item (or items) of the particular projector 40, the settable performance information that is present in the settable performance information included in the device performance information 4104 found based on the model ID acquired via the near field communication, but is not present in the settable performance information common to the pieces of the device performance information.

If it is determined that the particular projector 40 includes a specific item (or items), the UI unit 210' performs processing at Step S45. At Step S45, the UI unit 210' displays, on the display of the operation unit 2004, a specific item setting screen for making a setting (or settings) for the item (or items) specific to the particular projector 40. At this point, the UI unit 210' displays, on the display of the operation unit 2004, an alert display for prompting to specify whether to make a setting for the specific item (or each of the specific items) of the particular projector 40.

Figure 33:
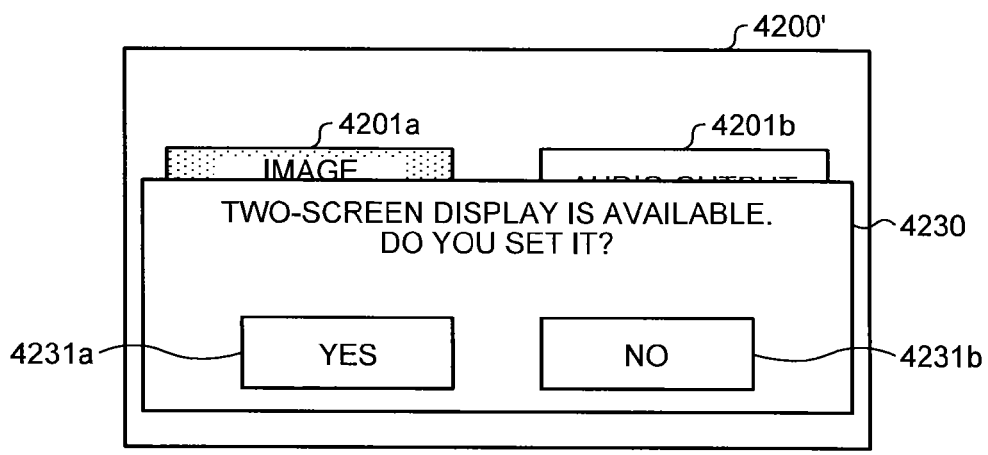
FIG. 33 is a diagram illustrating an example of an alert display according to the third embodiment.

FIG. 33 illustrates an example of displaying the alert display. A description will be made by taking the two-screen display as an example of the specific item of the particular projector 40, the two-screen display being a method that simultaneously projects two images arranged side by side into one projection image. In the example of FIG. 33, an alert display 4230 is displayed so as to overlap a common item setting screen 4200' on which the button 4201a is in an operated state (as indicated with shading in FIG. 33). The alert display 4230 is provided with buttons 4231a and 4231b for specifying whether to set the two-screen display.

Figure 34:
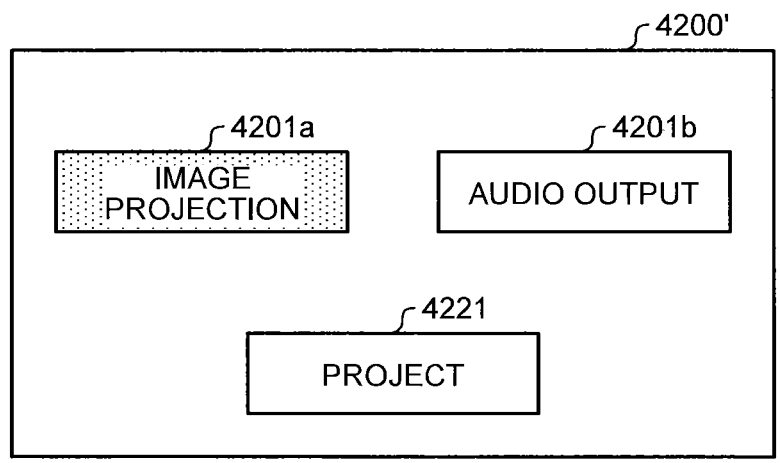
FIG. 34 is a diagram illustrating an example of a common item setting screen according to the third embodiment.

As a first example, a case will be described in which the two-screen display is not set (the one-screen display is to be performed) on the alert display 4230. When using the particular projector 40 from only one smart device 20', the user A operates, for example, the button 4231b to specify that the two-screen display is not to be set. In this case, the UI unit 210' displays the common item setting screen 4200' on the display of the operation unit 2004, as illustrated in FIG. 34. The common item setting screen 4200' is provided with a projection button 4221, instead of the end button 4202 on the common item setting screen 4200 illustrated in FIG. 31.

Suppose that the user A operates the projection button 4221 on the common item setting screen 4200' while the button 4201a for specifying the image projection is in the operated state. In this case, the network connection unit 201 of the smart device 20' establishes the communication with the projector 40 via the network 30, according to the already acquired communication information 4105. After the communication is established, the UI unit 210' encodes the image data to be projected that is stored in the already selected file into a compressed form, and sends the result from the communication I/F 2005 to the particular projector 40, using the network connection unit 201. If the image data represents a still image, a method of the Joint Photographic Experts Group (JPEG method) can be used as a compression coding method.

The UI unit 210' can display the data of the already selected file storing the image data to be projected, on the display of the operation unit 2004. For example, the UI unit 210' displays a preview of an image based on the image data stored in the file by reducing the display size of the image data and displaying the result on the display of the operation unit 2004.

The particular projector 40 receives the image data sent from the smart device 20' via the communication I/F 4004, using the network connection unit 4101. The image projection unit 4111 in the particular projector 40 decodes the compressed code of the received image data, and projects the result onto the projection target medium 4050.

As a second example, a case will be described, with reference to the flowchart of FIG. 30, in which the two-screen display is set on the alert display 4230 at Step S45. The description here assumes that the processing described above has already projected the image (called a projection image #1) based on the image data sent from the smart device 20' of the user A. As an example, a case will be described in which a user B uses another smart device 20' (hereinafter, called the other smart device 20') held by the user B to project and display an image (called a projection image #2) based on image data stored in a file stored in the other smart device 20' from the particular projector 40.

In this case, setting the two-screen display by the user B allows the projector 40 to simultaneously project the projection images #1 and #2 (for example, so as to be arranged in the horizontal direction) into one projection image. If the user B sets the one-screen display, the projector 40 switches the projected image from the already projected projection image #1 to the projection image #2.

Prior to the processing of the flowchart in FIG. 30, the user B operates the other smart device 20' to start the projector application, and select a file that stores image data to be projected using the projector 40.

The other smart device 20' subsequently performs the above-described processes of Steps S40 to S45 in the same manner as described above. Specifically, the UI unit 210' of the other smart device 20' (hereinafter, called the other UI unit 210') displays the common item setting screen 4200 at Step S40, and, if determining that the selection input of a function is made at Step S41, displays the operation guide screen 4210 at the next step, Step S42. According to the display of the operation guide screen 4210, the other smart device 20' is held near the position of the IC tag of the particular projector 40, so that the near field communication is performed between the other smart device 20' and the IC tag of the projector 40. Using the near field communication, the UI unit 210' of the other smart device 20' acquires the communication information 4105 and the model ID from the storing unit 4103 in the IC tag (Step S43).

The other UI unit 210' searches the device performance information DB 204 based on the acquired model ID, and determines whether the particular projector 40 includes a specific item (or items) (Step S44). In this case, the particular projector 40 includes a specific item, so that the other UI unit 210' displays the alert display 4230 for prompting to specify whether to set the two-screen display that is the specific item of the particular projector 40 (Step S45).

On the alert display 4230, the user B operates the button 4231a to specify the setting of the two-screen display so as to project the projection image #2 based on the file selected by the user B together with the projection image #1 already projected by the user A. In response to the operation of the button 4231a, the other UI unit 210' displays a projection position selection screen 4240 illustrated in FIG. 35, on the display of the operation unit 2004.

Figure 35:
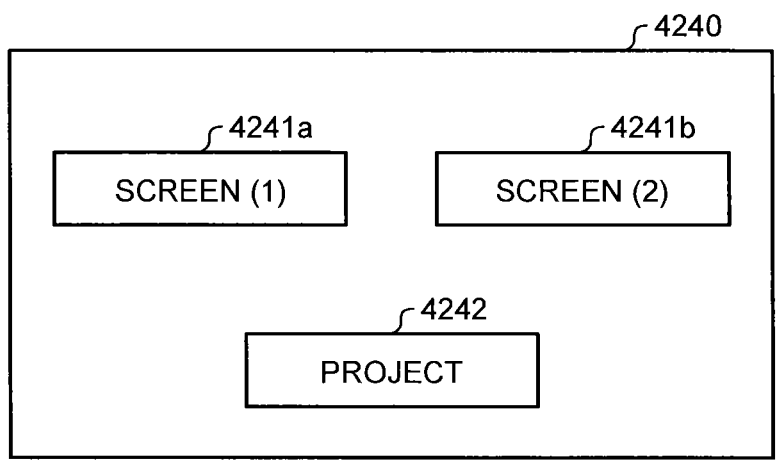
FIG. 35 is a diagram illustrating an example of a projection position selection screen according to the third embodiment.

In the example of FIG. 35, the projection position selection screen 4240 is provided with buttons 4241a and 4241b for specifying the projection position of the projection image in the two-screen display, and with a projection button 4242. The button 4241a specifies the projection position of the projection image to be on the left side (screen (1)) in the two-screen display. The button 4241b specifies the projection position of the projection image to be on the right side (screen (2)) in the two-screen display.

For example, if the user B operates the button 4241b to specify the right side as the projection position of the projection image and operates the projection button 4242, the network connection unit 201 of the other smart device 20' establishes the communication with the particular projector 40 according to the communication information 4105 acquired at Step S43. After the communication is established, the UI unit 210' of the other smart device 20' uses the network connection unit 201 to send, to the particular projector 40, a two-screen display command including information indicating the specified projection position of the projection image (the right side, in this example). The projector 40 receives the two-screen display command.

The two-screen control unit 4112 in the particular projector 40 follows the received two-screen display command to switch the projection of the image by the image projection unit 4111 to the projection by the method of the two-screen display. For example, the two-screen control unit 4112 follows the two-screen display command to reduce the size of the image based on the image data of the currently projected projection image #1, and generate image data for two-screen display in which the reduced-size image is arranged on the left side. The image projection unit 4111 projects the image based on the image data for two-screen display onto the projection target medium 4050. The projected image includes the projection image #1 arranged on the left side and, for example, a blank image arranged on the right side.

Then, the UI unit 210' of the other smart device 20' encodes the image data to be projected stored in the already selected file into a compressed form, and sends the result to the particular projector 40. The other UI unit 210' displays also a preview of the image based on the image data stored in the file by reducing the display size of the image data and displaying the result on the display of the operation unit 2004.

After the particular projector 40 receives the image data sent from the other smart device 20', the image processing unit 4114 decodes the compressed code of the received image data, and transfers the decoded image data to the two-screen control unit 4112. The two-screen control unit 4112 reduces the size of the image based on the image data transferred from the image processing unit 4114, and combines the image data with the image data for two-screen display so that the reduced-size image is arranged on the right side of the image of the projection image #1, thus updating the image data for two-screen display. The image projection unit 4111 projects the updated image data for two-screen display onto the projection target medium 4050. The projected image is an image in which the projection image #1 is arranged on the left side, and the projection image #2 based on the image data sent from the other smart device 20' is arranged on the right side.

If the button 4201b for specifying the audio output is operated on the common item setting screen 4200 (at Step S40) or the common item setting screen 4200' (at Step S45), the smart device 20' can send the audio data to the particular projector 40. For example, the smart device 20' incorporates a microphone, and captures sound with the microphone. The microphone converts the captured sound into an audio signal in an analog form, and feeds it to the audio input unit 2008.

On the smart device 20', the audio processing unit 205 converts the audio signal fed to the audio input unit 2008 into audio data through the A/D conversion. The audio processing unit 205 further encodes the converted audio data into a compressed form, and transfers the result to the UI unit 210'. For example, a method of the Moving Picture Experts Group-1 Audio Layer-3 (MP3 method) can be used as a compression coding method for the audio data. The UI unit 210' uses the network connection unit 201 to send the compression-coded audio data to the particular projector 40.

The particular projector 40 receives the audio data sent from the smart device 20' via the communication I/F 4004, using the network connection unit 4101. The audio processing unit 4113 in the particular projector 40 decodes the compressed code of the received audio data, and further converts the decoded audio data into an audio signal in an analog form through the D/A conversion. The audio signal in the analog form is amplified by the audio reproducing unit 4012, and fed to the speaker 4013.

For example, if both the image projection and the audio output are specified on the common item setting screen 4200 (at Step S40) or the common item setting screen 4200' (at Step S45), the user can, for example, output the sound captured by the microphone incorporated in the smart device 20' from the speaker 4013 of the particular projector 40, while projecting the image based on the image data sent from the smart device 20', onto the projection target medium 4050, using the particular projector 40.

The user A can specify the image projection on the smart device 20' of the user A, and the user B can specify the audio output on the other smart device 20' of the user B. In this case, the particular projector 40 can project the image based on the image data sent from the smart device 20' onto the projection target medium 4050, and can output the sound based on the audio data sent from the other smart device 20' from the speaker 4013.

Fourth Embodiment

A fourth embodiment of the present invention will be described. The fourth embodiment corresponds to the second embodiment described above, and has a configuration in which the communication information 4105 is stored in the storing unit embedded in the projector 40, and, in addition, a near field wireless connection unit is embedded in the projector 40. The fourth embodiment can use the smart device 20' described in the third embodiment without any modification.

Figure 36:
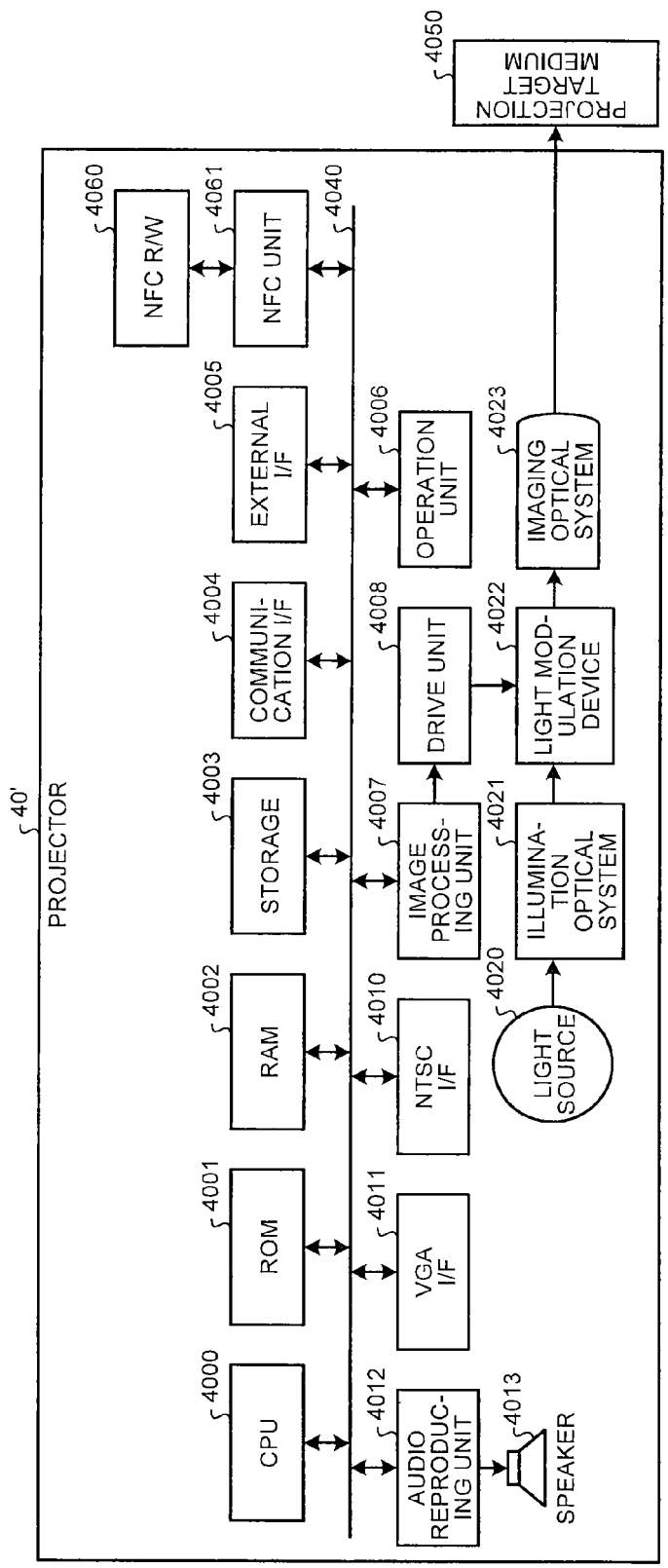
FIG. 36 is a block diagram illustrating an example of the hardware configuration of a projector according to a fourth embodiment of the present invention.

FIG. 36 illustrates an example of the hardware configuration of a projector 40' according to the fourth embodiment. In FIG. 36, the same reference numerals are given to parts in common with those of FIG. 25 explained above, and detailed description thereof will be omitted. In FIG. 36, the projector 40' is provided with an NFC unit 4061 and an NFC R/W 4060 instead of the NFC chip 4030 of FIG. 25. The NFC unit 4061 includes a memory, and a communication control unit for the near field communication. The NFC R/W 4060 includes an antenna for performing the near field communication. The NFC R/W 4060 performs start control of the NFC unit 4061, and reads and writes data from/to the memory included in the NFC unit 4061.

Figure 37:
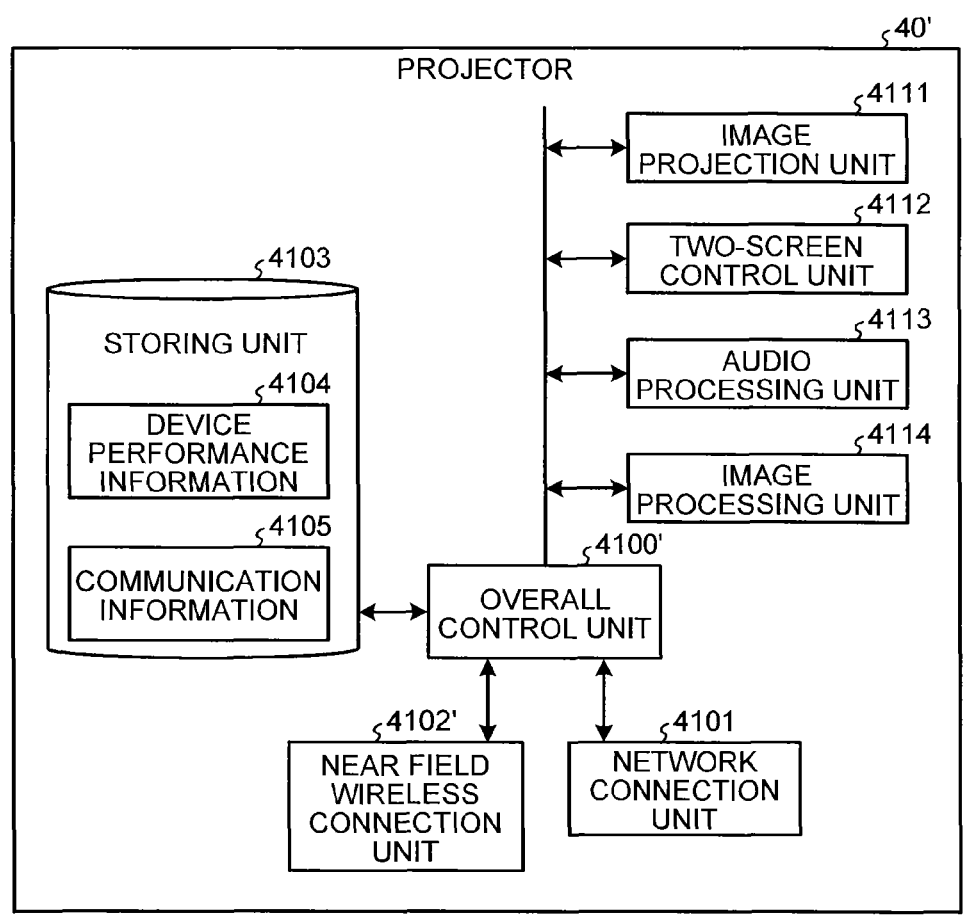
FIG. 37 is a functional block diagram for explaining functions of the projector according to the fourth embodiment.

FIG. 37 is a functional block diagram for explaining functions of the projector 40' according to the fourth embodiment. In FIG. 37, the same reference numerals are given to parts in common with those of FIG. 26 explained above, and detailed description thereof will be omitted.

In FIG. 37, in the projector 40', a near field wireless connection unit 4102' for performing the near field communication and the storing unit 4103 storing the communication information 4105 are connected to an overall control unit 4100'. In FIG. 37, the storing unit 4103 also stores therein the device performance information 4104. A position in the projector 40' that allows easy near field communication with the smart device 20' is selected as a mounting position of the NFC R/W 4060 used by the near field wireless connection unit 4102' to perform the communication.

The configuration of the fourth embodiment allows the projector 40' and the smart device 20' to bi-directionally communicate with each other via the near field communication. If the smart device 20' queries the particular projector 40' about the device performance information, the particular projector 40' stores the device performance information 4104 representing all functions of the particular projector 40' in a storage area for near field communication that serves as a storage area for storing information to be sent via the near field communication. The storage area for near field communication may also store therein the communication information 4105. The storage area for near field communication can use the memory included in the NFC unit 4061. The projector 40' is not limited to this, but may use the RAM 4002 or the storage 4003 as the storage area for near field communication.

During the near field communication with the smart device 20', the particular projector 40' sends the device performance information 4104 and the communication information 4105 that are stored in the storage area for near field communication, to the smart device 20'. The smart device 20' stores in advance the device performance information 4104 representing functions common to a plurality of projectors 40', and compares the device performance information 4104 representing the common functions with the device performance information 4104 sent from the particular projector 40' to extract information representing a specific item (or items) included in the device performance information 4104 sent from the particular projector 40'.

Processing according to the fourth embodiment will be described with reference to the flowchart of FIG. 30. Prior to the processing of the flowchart in FIG. 30, the user A operates the smart device 20' held by the user A to start the projector application, and select a file that stores image data to be projected using the projector 40'.

The UI unit 210' displays the common item setting screen 4200 at Step S40, and, if determining that the selection input of a function is made at Step S41, displays the operation guide screen 4210 at the next step, Step S42. According to the display of the operation guide screen 4210, the smart device 20' is held near the position of the near field wireless connection unit 4102' (position of the NFC R/W 4060) of the particular projector 40', so that the near field communication is performed between the smart device 20' and the near field wireless connection unit 4102' of the projector 40'. During the near field communication, the particular projector 40' sends the device performance information 4104 and the communication information 4105 that are stored in the storage area for near field communication, to the smart device 20'.

The UI unit 210' uses the near field communication to acquire the communication information 4105 and the model ID (Step S43), and also to acquire the device performance information 4104. The UI unit 210' searches the device performance information DB 204 based on the acquired model ID, and determines whether the particular projector 40' includes a specific item (or items) (Step S44). If it is determined that the particular projector 40' includes a specific item, the UI unit 210' displays, on the display of the operation unit 2004, the alert display 4230 for prompting to specify whether to set the two-screen display that is the specific item of the particular projector 40' (Step S45).

For example, if the user A operates the button 4231*b* on the alert display 4230 to specify that the two-screen display is not to be set, the UI unit 210' displays the common item setting screen 4200' on the display of the operation unit 2004. If, on the common item setting screen 4200', the projection button 4221 is operated while the button 4201*a* for specifying the image projection is in the operated state, the network connection unit 201 of the smart device 20' establishes the communication with the particular projector 40' according to the already acquired communication information 4105. After the communication is established, the UI unit 210' encodes the image data to be projected that is stored in the already selected file into a compressed form, and sends the result to the particular projector 40'. The UI unit 210' also displays an image based on data of the already selected file, such as image data stored in the file, on the display of the operation unit 2004.

After receiving the image data sent from the smart device 20', the particular projector 40' decodes the compressed code of the received image data, and projects the result as the projection image #1 onto the projection target medium 4050, using the image projection unit 4111.

A case will be described, with reference to the flowchart of FIG. 30, in which the user B uses the smart device 20' of the user B (the other smart device 20') to perform the two-screen display on the particular projector 40' that is projecting the projection image #1. Prior to the processing of the flowchart in FIG. 30, the user B operates the other smart device 20' to start the projector application, and select a file that stores image data to be projected using the particular projector 40'.

The other smart device 20' subsequently performs the display of the common item setting screen 4200 (Step S40), the determination of whether the selection input of a function is made (Step S41), and the display of the operation guide screen 4210 (Step S42), in the same manner as described above. When the other smart device 20' is held near the position of the near field wireless connection unit 4102' (position of the NFC R/W 4060) of the particular projector 40', the other smart device 20' performs the near field communication with the NFC R/W 4060 of the particular projector 40'. During the near field communication, the other smart device 20' queries the particular projector 40' about the device performance information. The particular projector 40' sends the communication information 4105 and the device performance information 4104 that is stored in the storage area for near field communication, to the other smart device 20'. The other smart device 20' receives and acquires the device performance information 4104 and the communication information 4105 sent from the particular projector 40' (Step S43).

The other smart device 20' compares the device performance information 4104 sent from the particular projector 40' with the common device performance information stored in advance in the storing unit 4103, and determines whether the particular projector 40' includes a specific item (or items) (Step S44). In this example, the other smart device 20' determines that the particular projector 40' has a two-screen display function as a specific item, and displays the alert display 4230 for prompting to specify whether to set the two-screen display, on the display of the operation unit 2004.

In the same manner as described above, if the setting of the two-screen display is specified on the alert display 4230, the UI unit 210' of the other smart device 20' displays the projection position selection screen 4240 on the display of the operation unit 2004. If the right side is specified as the projection position of the projection image and also the projection is specified by operations of the user B on the projection position selection screen 4240, the other smart device 20' establishes the communication with the particular projector 40' according to the acquired communication information 4105. After the communication is established, the UI unit 210' of the other smart device 20' sends a two-screen display command including information indicating the specified projection position of the projection image (the right side, in this example), to the particular projector 40'.

The two-screen control unit 4112 in the particular projector 40' follows the two-screen display command to switch the projection of the image by the image projection unit 4111 to the projection by the method of the two-screen display. For example, the two-screen control unit 4112 reduces the size of the image based on the image data of the currently projected projection image #1, and generates image data for two-screen display in which the reduced-size image is arranged on the left side; and the image projection unit 4111 projects the image based on the image data for two-screen display onto the projection target medium 4050.

Then, the UI unit 210' of the other smart device 20' encodes the image data stored in the already selected file into a compressed form, and sends the result to the particular projector 40'. The UI unit 210' of the other smart device 20' reduces the display size of the image data stored in the file and displays the result on the display of the operation unit 2004.

The image processing unit 4114 in the particular projector 40' receives the image data sent from the other smart device 20', and, after decoding the compressed code of the image data, transfers the decoded image data to the two-screen control unit 4112. The two-screen control unit 4112 reduces the size of the image based on the image data transferred from the image processing unit 4114, and combines the image data with the image data for two-screen display so that the reduced-size image is arranged on the right side of the image of the projection image #1, thus updating the image data for two-screen display. The image projection unit 4111 projects the updated image data for two-screen display onto the projection target medium 4050.

Also in the fourth embodiment, the processing on the audio data can be performed in the same manner as in the third embodiment described above.

In each of the third and the fourth embodiments described above, the case have been described in which the projector 40 (or 40') projects and displays the image based on the image data stored in the smart device 20'. The present invention is, however, not limited to this example. The third and the fourth embodiments can be applied in the same manner, for example, to a case of sending the image data stored in the smart device 20' to another display device, such as an electronic blackboard, and displaying thereon an image based on the image data.

The present invention provides an advantageous effect of being capable of improving convenience in using an image visualization device from a smart device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal device connectable to a plurality of models of a device, the terminal device comprising:
   processing circuitry configured to
      control a display to display a function selecting screen used for selecting a function from a plurality of functions which the device executes, and a first setting screen for accepting a first setting for the function selected on the function selecting screen that is executable by the plurality of models of the device;
      acquire, from a target device to be controlled via a first communication protocol, identification information identifying which of the plurality of models is a model of the target device;
      acquire, from the target device via the first communication protocol, communication information for communicating with the target device via a second communication protocol different from the first communication protocol;
      acquire, from a memory that stores processing information of one or more models representing at least information on processing executable by the one or more models in a manner associated with the identification information identifying the one or more models for each functions, the processing information of the selected function being associated with the acquired identification information; and
      transmit, to the target device via the second communication protocol, information representing the first setting accepted through the first setting screen displayed on the display, based on the acquired communication information, wherein
   when the processing information of the selected function includes information on a specific processing that is executable only by the model identified by the identification information associated with the processing information of the selected function, the processing circuitry is configured to
      control the display to display an alert superimposed upon the first setting screen, the alert identifying the specific processing and presenting a user with an option to select a second setting for the specific processing from the alert,
      control the display to display, when the second setting is selected from the alert, a second setting screen for accepting the second setting for the specific processing of the selected function, the second setting screen being a screen in which the specific processing is inserted into the first setting screen, and
      transmit a request to print image data, when the second setting is not selected from the alert, to the target device via the second communication protocol.

2. The terminal device according to claim 1, wherein when the memory does not store therein the identification information acquired via the first communication protocol, the processing circuitry is configured to acquire, via the second communication protocol, the identification information and device information corresponding to the identification information from the target device.

3. The terminal device according to claim 1, wherein the processing circuitry controls the display to display the first setting screen in advance before acquiring the identification information from the target device.

4. The terminal device according to claim 1, wherein the processing circuitry is configured to display a list of settings common to the plurality of models.

5. The terminal device according to claim 1, wherein the processing circuitry is configure to acquire, from the target device via the first communication protocol, the identification information when the terminal device is brought in close proximity or contact with the target device.

6. The terminal device according to claim 5, wherein the processing circuitry is configured to acquire the identification information when terminal device is bumped into the target device.

7. The terminal device according to claim 1, wherein the processing circuitry is configured to receive a first user input of the function selected on the function selecting screen.

8. The terminal device according to claim 1, wherein the processing circuitry is configured receive a second user input of the second setting accepted through the second setting screen.

9. An image processing system, comprising:
   an image visualization device;
   a communication device including first circuitry configured to store identification information identifying at least a model of the image visualization device, and communicate with a first device via a first communication protocol;
   the image visualization device including second circuitry configured to execute at least a function of visualizing an image according to image data, and communicate with a second device via a second communication protocol different from the first communication protocol; and a terminal device including third circuitry configured to:
control a display to display a function selection screen used for selecting a function from a plurality of functions which the device executes, and a first setting screen for accepting a first setting for the function selected on the function selecting screen that is executable by a plurality of models of the image visualization device;
acquire, from a target image visualization device to be controlled via the first communication protocol, identification information identifying which of the plurality of models is a model of the target image visualization device;
acquire, from the target image visualization device via the first communication protocol, communication information for communicating with the target image visualization device via the second communication protocol;
acquire, from a memory that stores processing information of one or more models representing at least information on processing executable by the one or more models in a manner associated with the identification information identifying the one or models for each functions, the processing information of the selected function being associated with the acquired identification information; and
transmit, to the target image visualization device via the second communication protocol, information representing the first setting accepted through the first setting screen displayed on the display, based on the acquired communication information, wherein when the processing information of the selected function includes information on specific processing that is executable only by the model identified by the identification information associated with the processing information of the selected function, the third circuitry is configured to
control the display to display an alert superimposed upon the first setting screen, the alert identifying the specific processing and presenting a user with an option to select a second setting for the specific processing from the alert,
control the display to display, when the second setting is selected from the alert, a second setting screen for accepting the second setting for the specific processing of the selected function, the second setting screen being a screen in which the specific processing is inserted into the first setting screen, and
transmit a request to print image data, when the second setting is not selected from the alert, to the target image visualization device via the second communication protocol.

10. The image processing system according to claim 9, wherein
the communication device is mounted on the image visualization device, and
the memory stores therein the identification information identifying at least a model of the image visualization device on which the communication device is mounted.

11. The image processing system according to claim 9, wherein
the communication device is included in the image visualization device, and the memory stores therein the identification information identifying at least a model of the image visualization device including the communication device.

12. The image processing system according to claim 9, wherein the third circuitry is configured to display a list of settings common to the plurality of models.

13. The image processing system according to claim 9, wherein the third circuitry is configured to receive a first user input of the function selected on the function selecting screen.

14. The image processing system according to claim 9, wherein the third circuitry is configured receive a second user input of the second setting accepted through the second setting screen.

15. A non-transitory computer-readable medium storing computer executable instructions that, when executed by a processing circuitry of a computer, cause the computer to execute a method, the method comprising:
controlling a display to display a function selecting screen used for selecting a function from a plurality of functions which the device executes, and a first setting screen for accepting a first setting for the function selected on the function selecting screen that is executable by a plurality of models of an image visualization device;
acquiring, from a target image visualization device to be controlled via a first communication protocol, identification information identifying which of the plurality of models is a model of the target image visualization device;
acquiring, from the target image visualization device the first communication protocol, communication information for communicating with the target image visualization device via a second communication protocol different from the first communication protocol;
acquiring, from a memory that stores therein processing information of one or more models representing at least information on processing executable by the one or more models in a manner associated with the identification information identifying the one or more models for each functions, the processing information of the selected function being associated with the acquired identification information;
transmitting, to the target image visualization device via the second communication protocol, information representing the first setting accepted through the first setting screen displayed on the display, based on the acquired communication information; and
when the processing information of the selected function includes information on specific processing that is executable only by the model identified by the identification information associated with the processing information of the selected function,
controlling the display to display an alert superimposed upon the first setting screen, the alert identifying the specific processing and presenting a user with an option to select a second setting for the specific processing from the alert;
controlling the display to display, when the second setting is selected from the alert, a second setting screen for accepting the second setting for the specific processing of the selected function, the second setting screen being a screen in which the specific processing is inserted into the first setting screen; and transmitting a request to print image data, when the second setting is not selected from the alert, to the target image visualization device via the second communication protocol.

16. The non-transitory computer readable medium according to claim 15, wherein the method further comprises:

when the memory does not store therein the identification information acquired via the first communication protocol, acquiring, via the second communication protocol, the identification information and device information corresponding to the identification information from the target image visualization device.

17. The non-transitory computer readable medium according to claim 15, wherein the method further comprises:

displaying the first setting screen in advance before acquiring the identification information from the target image visualization device.

18. The non-transitory computer-readable medium according to claim 15, wherein the method further comprises filtering the plurality of models based on the selected function.

19. The non-transitory computer-readable medium according to claim 15, wherein the method further comprises receiving a first user input of the function selected on the function selecting screen.

20. The non-transitory computer-readable medium according to claim 15, wherein the method further comprises receiving a second user input of the second setting accepted through the second setting screen.

* * * * *